United States Patent
Al-Sinan et al.

(10) Patent No.: US 11,514,511 B2
(45) Date of Patent: *Nov. 29, 2022

(54) AUTONOMOUS BIDDER SOLICITATION AND SELECTION SYSTEM

(71) Applicant: Saudi Arabian Oil Company, Dhahran (SA)

(72) Inventors: Mazen Al-Sinan, Dhahran (SA); Zainab Abdulla Aljaroudi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 322 days.

This patent is subject to a terminal disclaimer.

(21) Appl. No.: 16/828,305

(22) Filed: Mar. 24, 2020

(65) Prior Publication Data

US 2021/0304297 A1    Sep. 30, 2021

(51) Int. Cl.
*G06Q 30/08* (2012.01)
*G06Q 30/06* (2012.01)
(Continued)

(52) U.S. Cl.
CPC ........... *G06Q 30/08* (2013.01); *G06F 40/211* (2020.01); *G06F 40/30* (2020.01); *G06N 5/04* (2013.01);
(Continued)

(58) Field of Classification Search
None
See application file for complete search history.

(56) References Cited

U.S. PATENT DOCUMENTS

| 5,361,199 A | 11/1994 | Shoquist et al. |
| 7,072,857 B1 | 7/2006 | Calonge |

(Continued)

FOREIGN PATENT DOCUMENTS

WO    WO 2006024136    3/2006

OTHER PUBLICATIONS

Shin, S.L., "How AI enables stronger litigation," Property & Casualty 360, ALM Media Properties, LLC, Nov. 11, 2019. (Year: 2019).*

(Continued)

*Primary Examiner* — Nicholas D Rosen
(74) *Attorney, Agent, or Firm* — Fish & Richardson P.C.

(57) ABSTRACT

Systems and methods include a computer-implemented method for autonomous bidder solicitation and selection. A pro forma contract defined by a variables matrix of variables is created from a received procurement request. The web is scraped to identify potential bidders based on the variables. Suppliers are registered, including obtaining, through an on-line registration process, supplier registration information including commercial license information and bank account information for each supplier. Supplier registration information of the suppliers is authenticated. Bidders for the contract are selected, including creating a bidder list identifying suppliers who are to be invited to participate in bidding. Solicitations of interest are issued to bidders identified in the bidder list, the solicitations of interest including a statement of work. Bidding parties are evaluated to identify qualified bidders. A winning bidder is selected from the bidding parties. A final contract is created for the winning bidder.

19 Claims, 17 Drawing Sheets

(51) Int. Cl.
*G06Q 30/02* (2012.01)
*G06F 40/211* (2020.01)
*G06F 40/30* (2020.01)
*G06N 20/00* (2019.01)
*G06N 5/04* (2006.01)
*G06Q 50/18* (2012.01)
*G06Q 10/10* (2012.01)
*G06Q 20/08* (2012.01)
*G06Q 30/00* (2012.01)
*G06Q 40/02* (2012.01)

(52) U.S. Cl.
CPC ............ *G06N 20/00* (2019.01); *G06Q 10/10* (2013.01); *G06Q 20/0855* (2013.01); *G06Q 30/0185* (2013.01); *G06Q 30/0203* (2013.01); *G06Q 30/0605* (2013.01); *G06Q 30/0611* (2013.01); *G06Q 40/02* (2013.01); *G06Q 50/18* (2013.01)

(56) References Cited

U.S. PATENT DOCUMENTS

| | | | |
|---|---|---|---|
| 7,853,472 B2* | 12/2010 | Al-Abdulqader | G06Q 10/06311 705/7.13 |
| 7,853,482 B2* | 12/2010 | Kiefer | G06Q 30/0611 705/26.3 |
| 8,041,616 B2 | 10/2011 | Cullen, III et al. | |
| 8,560,366 B2 | 10/2013 | Mikurak | |
| 8,612,300 B2 | 12/2013 | Tung et al. | |
| 8,799,110 B2 | 8/2014 | Lobo et al. | |
| 8,849,685 B2 | 9/2014 | Oden | |
| 8,983,857 B2 | 3/2015 | Johnson | |
| 9,171,322 B2 | 10/2015 | Spievak et al. | |
| 9,443,192 B1 | 9/2016 | Cosic | |
| 9,779,364 B1 | 10/2017 | Hoover et al. | |
| 10,068,304 B1 | 9/2018 | Shuklabaidya et al. | |
| 10,324,457 B2 | 6/2019 | Neelakandan et al. | |
| 11,164,152 B2* | 11/2021 | Al-Sinan | G06F 40/30 |
| 2001/0011222 A1 | 8/2001 | McLauchlin | |
| 2001/0056379 A1 | 12/2001 | Fujinaga et al. | |
| 2002/0007324 A1 | 1/2002 | Centner et al. | |
| 2003/0208434 A1 | 11/2003 | Posner | |
| 2004/0215467 A1 | 10/2004 | Coffman et al. | |
| 2004/0267629 A1 | 12/2004 | Herrmann et al. | |
| 2005/0010512 A1* | 1/2005 | Gutbrod | G06Q 40/00 705/40 |
| 2005/0091122 A1 | 4/2005 | Kiefer et al. | |
| 2005/0246240 A1 | 11/2005 | Padilla | |
| 2006/0095314 A1* | 5/2006 | Wu | G06Q 30/0203 705/7.41 |
| 2006/0247959 A1 | 11/2006 | Oden | |
| 2007/0016514 A1 | 1/2007 | Al-Abdulqader et al. | |
| 2008/0120129 A1 | 5/2008 | Seubert et al. | |
| 2012/0016678 A1* | 1/2012 | Gruber | G06F 3/167 704/E21.001 |
| 2012/0254001 A1 | 10/2012 | Ran | |
| 2014/0379387 A1 | 12/2014 | Au Li | |
| 2016/0098389 A1 | 4/2016 | Bruno et al. | |
| 2016/0358235 A1 | 12/2016 | De Langis | |
| 2017/0232300 A1 | 8/2017 | Tran et al. | |
| 2018/0204263 A1* | 7/2018 | Buezas | G06Q 30/0619 |
| 2018/0329399 A1 | 11/2018 | Neelakandan et al. | |
| 2018/0332102 A1 | 11/2018 | Sheidaei | |
| 2018/0365324 A1* | 12/2018 | Finberg | G06N 5/04 |
| 2020/0004834 A1 | 1/2020 | Sadeddin et al. | |
| 2020/0019932 A1 | 1/2020 | Harris et al. | |
| 2020/0082000 A1 | 3/2020 | Sudheendra et al. | |
| 2020/0258031 A1 | 8/2020 | Makhija | |
| 2020/0274389 A1 | 8/2020 | Islam et al. | |
| 2020/0359550 A1 | 11/2020 | Tran et al. | |
| 2021/0133790 A1 | 5/2021 | Manning et al. | |
| 2021/0304149 A1 | 9/2021 | Al-Sinan et al. | |

OTHER PUBLICATIONS

Miehle et al., "Toward a Decentralized Marketplace for Self-Maintaining Machines," IEEE International Conference on Blockchain (Blockchain), 2019, 431-438, 8 pages.

smartprocurement.co.za [online], Marland, "Autonomous procurement: the next evolution," SMME Clinic, Nov. 14, 2019, retrieved Aug. 13, 2021, retrieved from URL <http://www.smartprocurement.co.za/autononnous_procurement_the_next_evolution.php#sthash.VS7pldwv.rSnYnWos.dpbs.>, 2 pages.

zycus.com [online], Ghosh, "From Augmented Procurement to Autonomous Procurement" In Procurement Technology, Mar. 1, 2019, retrieved from URL <https://www.zycus.com/blog/procurement-technology/augmented-procurement-to-autonomous-procurement.html>, 5 pages.

PCT International Search Report and Written Opinion in International Appln. No. PCT/US2021/023813, dated Jun. 22, 2021, 15 pages.

Fong et al., "Design of a web-based tendering system for e-government procurement," Theory and Practice of Electronic Governance, Nov. 2009, XP058111734, 8 pages.

Lan, "A knowledge-based system to support procurement decision," Journal of Knowledge Management, Feb. 2005, 9(1): 87-100, 14 pages.

PCT International Search Report and Written Opinion in International Appln. No. PCT/US2021/023821, dated Jun. 21, 2021, 16 pages.

* cited by examiner

AUTONOMOUS BIDDER SOLICITATION AND SELECTION SYSTEM

BACKGROUND

The present disclosure applies to procurement processes that include creating statements of work and finding bidders to complete the work.

The procurement process, can include activities that are governed by certain procedures and regulations that aid in maintaining the integrity of the process. A given procurement scenario can typically be initiated due to a need for services that are to be performed or products that are to be delivered. The principles of the procurement process are generally the same, with minor differences based on the procedures and rules that can vary form one organization (buyer) to another. Conventional systems for procurement typically involve many steps, some of which requiring human intervention.

SUMMARY

The present disclosure describes techniques that can be used for automating a complete procurement process. In some implementations, a computer-implemented method includes the following. A pro forma contract is created by an autonomous bidder solicitation and selection system. The pro forma contract is defined by a variables matrix of variables and is created from a procurement request received from a user. The web is scraped by the autonomous bidder solicitation and selection system to identify potential bidders based on the variables defining the pro forma contract. Suppliers are registered by the autonomous bidder solicitation and selection system, including obtaining, through an on-line registration process, supplier registration information including commercial license information and bank account information for each supplier being registered. Supplier registration information of the suppliers is authenticated by the autonomous bidder solicitation and selection system. Bidders for the pro forma contract are selected by the autonomous bidder solicitation and selection system, including creating a bidder list identifying suppliers who are to be invited to participate in bidding or submitting a quotation. Solicitations of interest are issued, by the autonomous bidder solicitation and selection system, to bidders identified in the bidder list, the solicitations of interest including a statement of work (SOW). Bidding parties are evaluated by the autonomous bidder solicitation and selection system to identify qualified bidders. A winning bidder is selected from the bidding parties by the autonomous bidder solicitation and selection system. A final contract is created for the winning bidder.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, an autonomous procurement system can run an entire procurement process without human intervention, from pro forma contract creation through the selection of a winning bidder. Second, negotiations can be conducted in a structured way instead of in an intuitive way. Third, the system can comprehend specific organizations' policies and procedures, and their applicability in different procurement scenarios.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for automating an entire procurement process. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Conventional systems may be limited to discrete activities rather than a holistic autonomous solution. While discrete portions of conventional systems may employ artificial intelligence (AI) as a support tool in the procurement process, techniques of the present disclosure are based entirely on AI developments.

In addition to resulting in payroll savings in an organization, eliminating human intervention can enhance the integrity of the procurement process. For example, developing a highly-skilled professional procurement staff can be time-consuming and costly, unlike a self-reliant solution provided using an autonomous system. Moreover, machine learning techniques can provide solutions during a lessons learned segment of a procurement process, such as an organizations' failure to capture all issues and training challenges involved with procurement.

Limitations of conventional systems can be overcome using techniques of the present disclosure. In some implementations, the techniques can generally include creating pro forma contracts, selecting bidders, registering suppliers, authenticating supplier registration information, issuing solicitations of interest, conducting prequalification, conducting financial qualification, scraping the web to identify potential bidders, scraping the web to create a work statement, conducting commercial evaluations, conducting technical evaluations, conducting negotiations, developing estimates, and processing payments.

Figure 1:
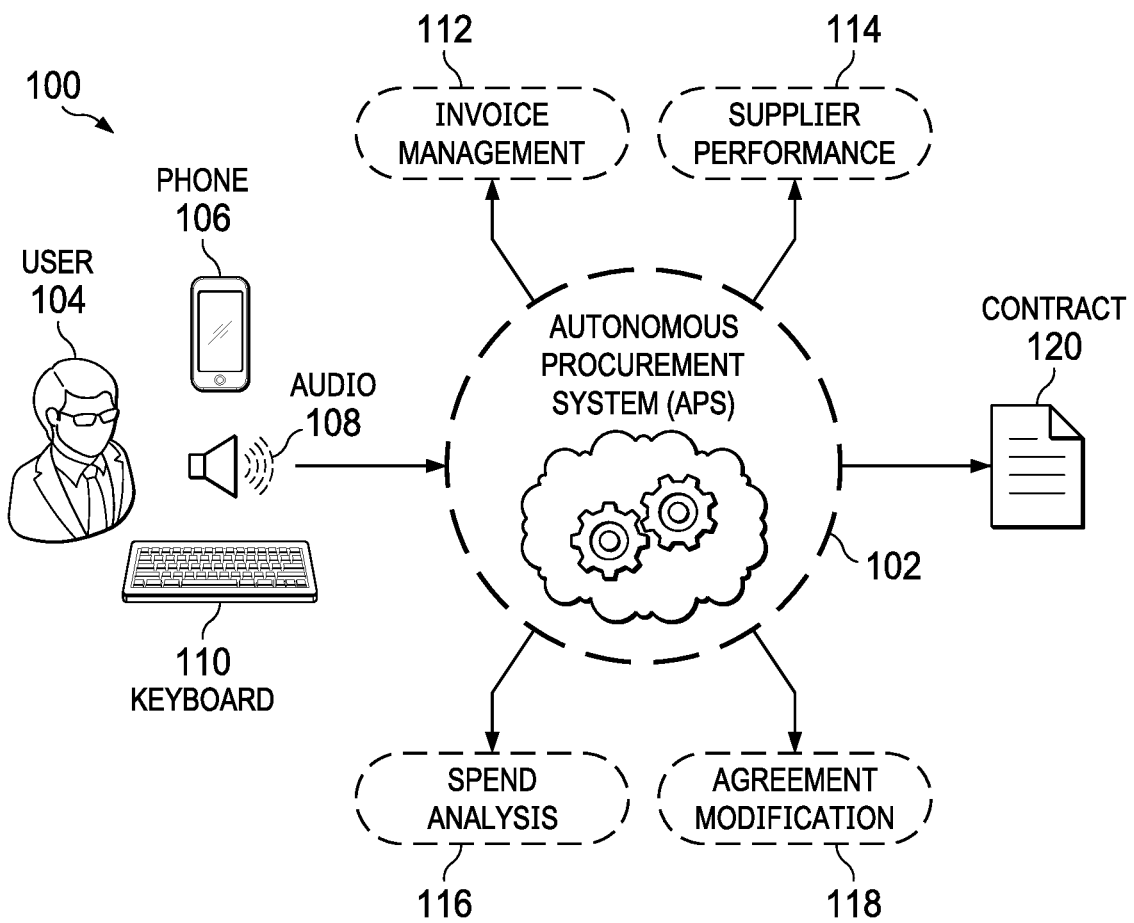
FIG. 1 is a block diagram showing an example of an autonomous procurement system (APS) system architecture for providing autonomous procurement, according to some implementations of the present disclosure.

FIG. 1 is a block diagram showing an example of an autonomous procurement system (APS) system architecture 100 for providing autonomous procurement, according to some implementations of the present disclosure. An APS 102 at the center of the APS system architecture 100 can provide steps needed for an entire procurement process, including services that are performed autonomously without any human intervention. A user 104 (for example, a service requestor) can create a procurement request in the APS 102 either verbally (for example, by phone 106 or audio 108) or in writing (for example, through a keyboard 110). The APS (or system) 102 can perform all the activities of the procurement process including selecting bidders, issuing solicitation of interest, producing appropriate contracts pro forma, issuing invitations for proposals, receiving commercial and technical proposals, performing technical and commercial evaluation, selecting the winner supplier, and obtaining the signatures of both parties. The system 102 can be configured to use various applications and technologies including blockchain, natural language processing, and machine learning techniques to discover, analyze, and provide recommendations in all procurement aspects. The integration of the various applications can be built on a special platform using a suitable programming language (for example, Python) as a back-end and a more user-friendly application as a front-end (for example, C# or PHP). In addition to the core, the autonomous procurement solution can be linked to peripherals to execute invoice management 112, supplier performance 114, spend analysis 116, and agreement modification 118. The system 102 can be used for one or either of purchasing goods and acquiring services, even though the procurement process for services can be more complex. An output of the system 102 can be a contract 120 that includes the requirements determined by the system 102.

Twelve Core Steps in the Procurement Process

Figure 2:
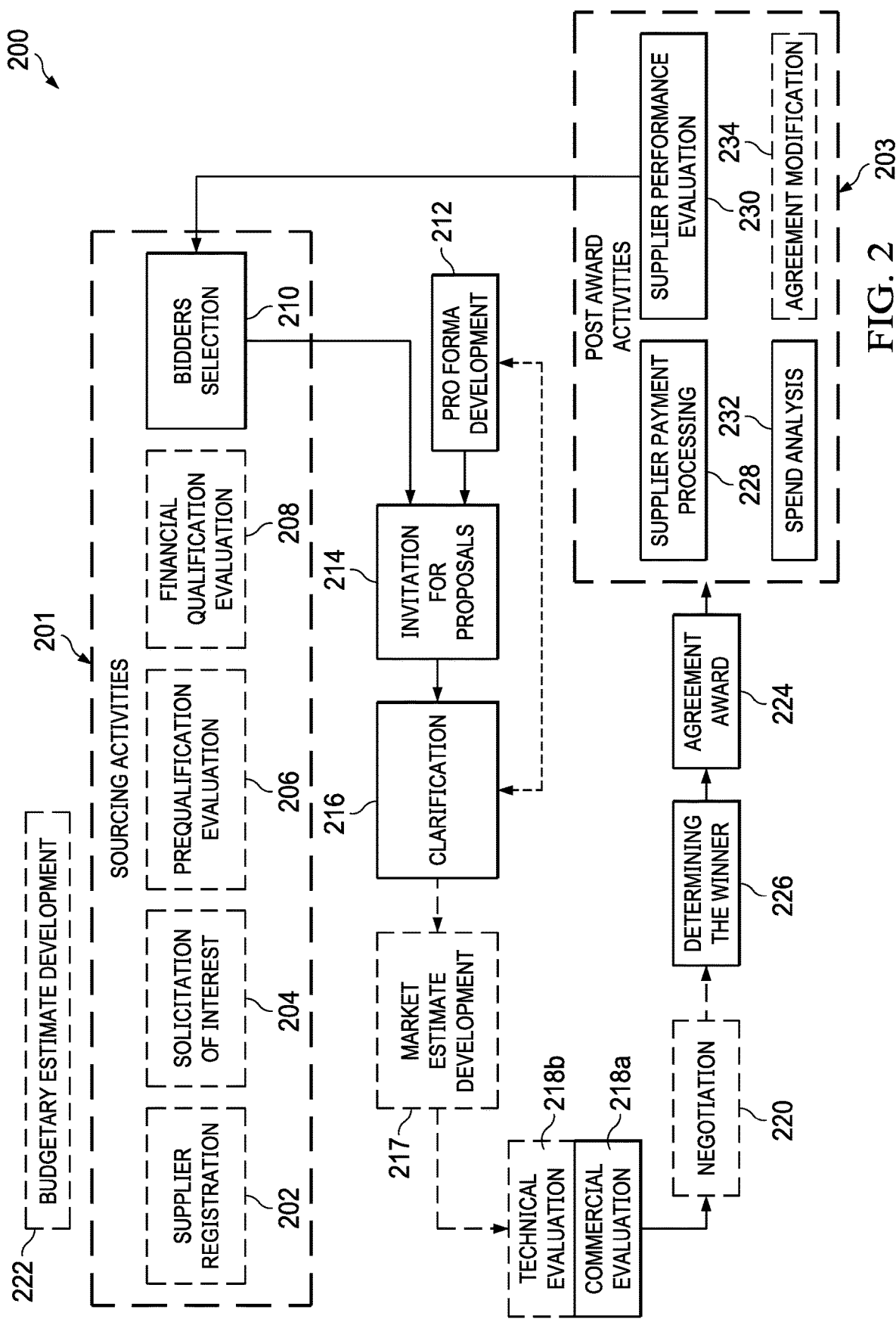
FIG. 2 is a block diagram showing an example of a workflow for a procurement process, according to some implementations of the present disclosure.

FIG. 2 is a block diagram showing an example of a workflow 200 for a procurement process, according to some implementations of the present disclosure. In some implementations, activities having dashed outlines can be optional activities. The workflow 200 can include sourcing activities 201 and post award activities 203. In some implementations, the workflow 200 can include twelve primary (or general) steps as follows.

Supplier Registration 202: As a common industry practice, suppliers typically register with the buyers with whom the suppliers are interested in conducting business. In order for a supplier to be registered, a buyer usually requests that a supplier provides documentation such as commercial license and bank account number information. Although many large organizations (or buyers) may provide online supplier registration platforms, many of the organizations typically conduct manual authentication before issuing a supplier registration number (such as a supplier number). The buyer sometimes sends registration invitations to suppliers, either to build a database of potential suppliers for future business opportunities or to consider the suppliers for a particular imminent procurement. Public tendering suppliers involved in open bidding are usually mandated to register in order to be considered. However, supplier registration is not always necessary, such as in cases where goods or services are acquired from a retail company.

Solicitation of Interest (SOI) 204: In order to identify potential bidders who are interested in participating in the bidding process, the SOI communication can be sent by the APS to the potential bidders. The SOI communication can provide a brief description of the scope of work and the expected timeframe. This step can rely on advance knowledge of the number of potential bidders. In addition, the SOI communication can give potential bidders an early notice of an upcoming opportunity. In some cases, interested bidders can be requested to submit their technical prequalification proposal. In case the number of potential bidders is small, additional endeavors can be used to expand the competition. This activity can be skipped, for example, if a minimum number of bidders is not set.

Prequalification Evaluation 206: Prequalification evaluation can be carried out after issuing the SOI for the suppliers who indicated their interest. The purpose of the prequalification evaluation is to assess the technical capabilities of potential bidders to ensure they are qualified to deliver the requirements of the scope of work. Usually, a questionnaire can be sent to the suppliers to be filled and submitted as a technical prequalification proposal. The questionnaire can address previous experience and resources. The evaluation of the technical prequalification proposal can be conducted against a pre-established evaluation criteria. This activity can be skipped in some procurements for various reasons, such as in the case of sole source or non-critical procurements or if particular suppliers have previously delivered the same services.

Financial Qualification Evaluation 208: Financial qualification evaluation including assessing the financial capabilities of the bidders is important, especially in lump sum project procurements. This is important to mitigate potential financial risks since a contractor's poor cash flow can lead to the contractor's default. The financial qualification evaluation can be conducted based on the review and analysis of the supplier financial statement. This activity can be optional depending on the nature of the procurement. In addition, in some jurisdictions, the activity can be mandatory to provide a performance bond which can eliminate the need to conduct a financial qualification evaluation.

Bidders Selection 210: Bidders selection is the process of identifying suppliers who are to be invited to participate in the bidding or submit a quotation (from which a bidder list is created). In some cases, mainly low-risk tendering and public tendering, bidding can be open, meaning that any supplier can participate in the bidding. In other cases, it may be preferred to invite only prequalified and well-known suppliers, or limit the bidding to a single source.

Pro Forma Development 212: This is the process of preparing an agreement as a basis for bidding. A typical agreement can include two main sections; general terms and conditions, and a statement of work. General terms and conditions, including liabilities, warranties, termination, and suspension, are usually standard and legally sufficient. A challenging aspect in developing a contract document is to write the actual requirements (for example, in a statement of work). The statements of work can vary in their complexities depending on the nature of acquired goods and services. The following are the typical sources for writing a statement of work.

Pervious similar agreements can include agreements, especially operation agreements, that are repetitive in nature, such as janitorial service agreements, where old or existing agreement can be used with or without modifications.

Engineering office can serve as a source for construction agreements, where design and specifications are provided by the engineering office. The statement of work can basically be the specifications and the drawings.

Developing the statement of work from scratch (or ad hoc) can be done if the requirements are new and have never been procured before. The statement of work writer can usually follow the common style and structure of prior work statements, describing the requirements and obligations of the supplier based on the input of a procurement beneficiary.

Using a supplier's statement of work can be done in some cases. Suppliers can have their own standard agreement. This is common in software license agreements, for example. Also, buyers can sometimes solicit suppliers to submit their statement of work, especially for a new methodology or technology.

Any agreement that is made can include a payment provision. The payment can be a lump sum with a progress payment, or a time unit rate or work unit rate.

Invitation for Proposals 214. This can include the process of sending or announcing the invitation to either all interested suppliers (for example, in open bidding) or to selected suppliers. The invitation can typically be accompanied by a pro forma contract, commercial proposal form, and special instructions such a bid closing date and how to submit the proposals.

Clarification 216. Supplier may have queries regarding the statement of work that should be addressed before the bid closing date. The clarification can sometimes entail a revision to the original pro forma that was sent with the invitation. Usually, the answers to clarification questions are sent to all bidders. Information determined during clarification 216 can be provided to market estimate development 217, which can develop estimates corresponding to market conditions associated with industries affected by the sourcing activities 201.

Commercial Evaluation 218a and Technical Evaluation 218b. Technical and commercial evaluations are two separate activities that can be conducted either sequentially or concurrently. The technical evaluation can usually be carried out based on pre-established evaluation criteria. The process can be objective in which the technical proposal is intended to answer a set of questions, where the evaluation criteria can hold a specific weight for each answer. The objective of the technical evaluation can be to assess the supplier's capability to deliver the requirements under the proposed agreements. A technically prequalified supplier can fail to pass the technical evaluation for various reasons, such as the unavailability of resources to meet the schedule. The focus in the technical evaluation can be on the supplier's capability in regard to the proposed agreement subject to the procurement.

The commercial evaluation can typically be conducted by comparing all commercial proposals and ranking them accordingly. Suppliers can submit more than one proposal in which each alternative can be considered and evaluated as a separate bid.

The evaluation can include a first step in which the technical evaluation is conducted and a second step in which commercial evaluation is conducted for those bidders who have passed the technical evaluation. Another common methodology is to assign weights for each of the technical and commercial proposals. The bidder with the overall highest score can be recommended for award. In some cases, the technical evaluation can be skipped if it does not add value, such as in the case of a single source or when standard goods or services are being purchased.

Negotiation 220: In some cases, especially in the case of a single source, conducting negotiations with the lowest bidder can be beneficial. The negotiations can be limited to the commercial proposal, but can also include negotiating the terms and conditions. Even when the negotiations cover the terms and conditions, there can be monetary values for the negotiated terms and conditions. In some cases, the buyer can conduct negotiations with one, some, or all the suppliers.

Budgetary Estimate Development 222: Typically, two estimates can be developed, namely a budgetary estimate and a detailed estimate. The budgetary estimate can be used to provide the buyer with an estimated value of the proposed procurement. This can help the buyer to make a decision either to proceed with the procurement, or not to proceed with the procurement if the budgetary estimate exceeds the approved budget. Another option for the buyer is to downsize the scope of work to meet an approved budget. The accuracy of the budgetary estimate can be up to +/−30%.

Detailed estimates can be more important when there is a single source where negotiation is going to take place. The accuracy of the detailed estimates is higher than the budgetary estimate and theoretically it should be around +/−10%. This entails determining all resources required to perform the agreement including materials, manpower, and equipment. In addition, productivity and any special circumstances that can impact the cost can be taken into account including external factors such as the market conditions. The detailed estimates can also important for analyzing price realism and for setting negotiation parameters. The detailed estimates can also serve as an additional commercial proposal. For competitive bidding, there may be no need to develop a detailed estimate since the competition can reflect the fair market price. At the same time, there may be some procurements where it is impossible to develop a realistic estimate such as in case of purchasing a piece of art or newly-released software. The reason for having two different estimates is because the detailed estimate cannot be developed unless the final pro forma is completed and usually it takes long time to develop a pro forma.

Agreement Award 224: Determining the winning bidder 226 can be based on the commercial and technical evaluations or the outcome of the negotiations. The awarded supplier can be informed with the results, as well as all other bidders. Special requirements or instructions can be provided to the awarded contractor such as providing performance bonds or bank guarantees. After that, the agreement can be signed by both parties.

Essential Contract Administration Processes

In addition to the twelve core steps in the procurement process, essential contract administration processes are also needed. The essential contract administration processes can include, for example, supplier payment processing, supper performance evaluation, and strategic processes (such as spend analysis).

Supplier Payment Processing 228: The supplier can submit an invoice per the signed agreement for the delivered services or materials. The buyer can certify and verify the invoice and process the payment. Conventional processes of certification and verification are typically manual especially for services. However, for materials, many organizations have developed automated solutions in which the payment is triggered automatically upon the receipt of the goods.

Supplier Performance Evaluation 230: Maintaining a record of the supplier's performance is important to provide a basis for future dealings and whether the supplier should be considered or excluded from future bidding.

Spend Analysis 232: Analyzing buyer spends can help in identifying opportunities to leverage the spend. Organizations can classify transactions coming from different sources, such as invoices and purchase orders, into categories and subcategories. Analyzing data sets and finding new patterns in the supply chain can guide and optimize the organization's decision-making process.

During the execution of any agreement it is possible that some terms and conditions or requirements will need to be modified. For example, using agreement modification 234, the agreement can be modified to be in a different format, such as using a change order or amendment.

General Description of the Autonomous Procurement System

The present disclosure describes how the twelve core steps (of the procurement process) and the essential contract administration processes can be fully automated and synchronized with one another. In some implementations, activities associated with the twelve core steps of the procurement process can be executed autonomously without any human intervention, using the following general steps. The service requestor can create a procurement request in the system either verbally or in writing. The system can perform all the activities of the procurement process including selecting bidders, issuing solicitation of interest, producing appropriate contract pro forma, issuing invitations for proposals, receiving commercial and technical proposals, performing technical and commercial evaluation, selecting the winner supplier, and obtaining the signatures of both parties. The system can be implemented by assembling various applications and technologies including blockchain, natural language processing, machine learning, and advanced analytics techniques to discover deeper insights, make predictions and give recommendations in all procurement aspects. The integration of the various applications can be built on a special platform using a suitable programming language (for example, Python) as a back-end and a more user-friendly application as a front-end. The twelve core steps (of the procurement process) and the essential contract administration processes can occur in different sequence as needed.

System Configuration

The system can be initially configured with default policies that are used in the underlying logic of certain modules. The defaulted initial policies can represent the best market practices. However, changes can be made to default settings to accommodate special cases or to customize a specific procurement. Table 1 lists policies (and their defaults) that can be used in the main activities of autonomous procurement:

TABLE 1

Buyer Policy Matrix

| Buyer Policy | Affected Module | Default Conditions |
| --- | --- | --- |
| Financial Qualification | Financial Qualification | Mandatory for lump sum construction procurement with value more than $1MM |
| SOI | SOI | Mandatory for Selective Bidding and Ad Hoc Bidding |

TABLE 1-continued

Buyer Policy Matrix

| Buyer Policy | Affected Module | Default Conditions |
|---|---|---|
| SOI Duration | SOI | 10 days as a default condition |
| Prequalification | Prequalification Evaluation | Mandatory for all new registered suppliers with procurement estimates more than $1MM |
| Bidding Strategy | Bidders Selection | Open Bidding |
| Performance Bond | Financial Qualification | When performance bond is mandatory, financial qualification is not needed. |
| Estimate Development | Estimate Development | There is no need to prepare estimates when the bidding type is competitive. |
| Supplier Access to Estimated Quantities | Hypothetical Quantities Module | Estimated quantities are not shared with the supplier and can be used for the sake of evaluation only. |
| Consumer Indices | Estimate Development | Extract consumer indices from the Department of Commerce website. |
| Award Strategy | Technical and Commercial Evaluation Agreement Award | Weighted evaluation formula for technical and commercial scores |

Pro Forma Development

Pro forma development is one of the most challenging activities in the procurement process since it requires cognitive capabilities that depend heavily on the competence and experience of procurement professionals. Although traditional programming can have limitations when performing this task, natural language processing (NLP) and machine learning (ML) can create a pro forma of similar, if not superior, quality to that processed by a human being. NLP and ML can be included in the first activity executed by the system when a user initiates a procurement request, as NLP and ML can provide key inputs to many other modules of the system.

Figure 3:
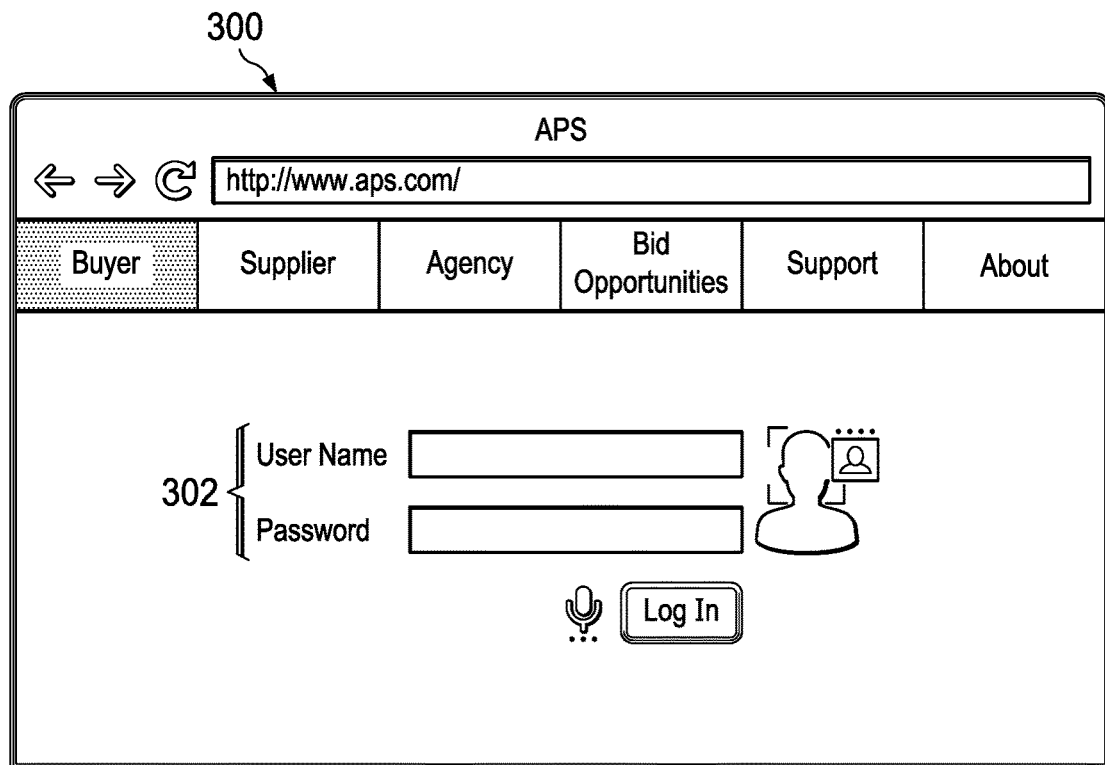
FIG. 3 is a screenshot showing an example of a buyer web page, according to some implementations of the present disclosure.

FIG. 3 is a screenshot showing an example of a buyer web page 300, according to some implementations of the present disclosure. The buyer web page 300 can be unlocked using several user authentication and recognition options 302, including biometric identification (such as finger prints, iris, facial, or voice recognition) and traditional passwords. These authentication methods can protect the system from unauthorized requests or modifications. After the buyer web page 300 is unlocked, the user can start feeding the request and required parameters to the system through one or more of vocal and written statements.

Figure 4:
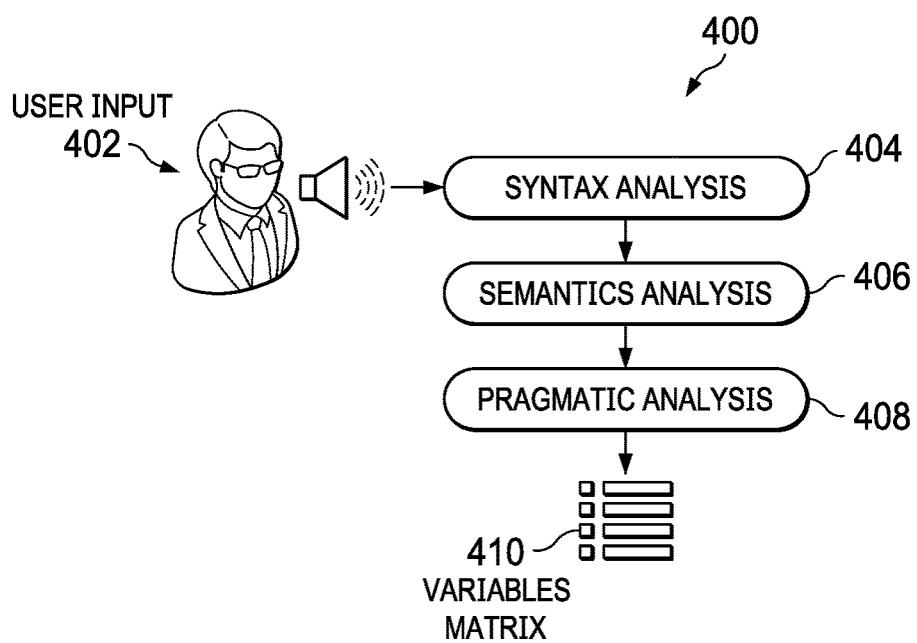
FIG. 4 is a block diagram showing an example of a workflow for user input analysis, according to some implementations of the present disclosure.

FIG. 4 is a block diagram showing an example of a workflow 400 for user input analysis, according to some implementations of the present disclosure. Pro forma development can be linked to the initiation of the procurement request, such as through user input 402. For example, in order to initiate a procurement process, the user can either verbally (or in writing) instruct the system to begin the sourcing activities. If the request is verbal, the system can convert verbal commands to text using speech recognition algorithms (for example, Linux Speech Recognition Software—Open Source). Then, NLP algorithms can process and analyze the text by applying three of NLP components such as syntax, semantics, and pragmatics in addition to using ML algorithms. Syntax analysis 404 can be used to ensure that the arrangement of words forms a grammatically correct sentence. Then, semantics analysis 406 can be used to extract the dictionary meaning of each word from the given text, irrespective of the context. Finally, pragmatic analysis 408 can be used to draw the actual meaning of the text in its context, whether the text forms a command or an informative statement.

As an example, a procurement request can be: "I would like to procure a replacement Janitorial Service contract for North Park Building for a duration of a three years base period, and two years as an extension option. The only change to the existing contract is to add the outdoor building glass to be cleaned monthly."

There are many open source software applications that can be used to conduct NLP analysis such as Bidirectional Encoder Representation from Transformers (BERT), Pytorch, Colab, and Textdata. BERT, a language model released by Google, is a suitable option that can provide superior performance and simplicity in implementation. One advantage of using BERT is the attention block feature that puts more emphasis on keywords in the text to recognize the request parameters more easily. This information can be fed to Python or another programming language to fill a variables matrix 410 with certain variables that are necessary to commence the pro forma development. In some implementations, the variables can include the following: 1) the general category of the scope of work (for example, janitorial services, software licenses, or consultancy services); 2) the duration of the contract; 3) the location of work; and 4) the contract type (for example, replacement or new).

The user can specify additional variables in the matrix to emphasize their preferences. If the user fails to provide some of the mandatory variables, such as the commencement date of the contract, the system can ask the requestor to complete all mandatory fields. An example matrix is provided in the following table:

TABLE 2

Procurement Request Variable Matrix

| Variable | Variable Type | Input |
|---|---|---|
| Contract Type | Mandatory | Replacement or New |
| Scope Category | Mandatory | Operation/ Project/General Service/ Software/Consultancy |
| Location | Depends on Scope Category. Default is Mandatory. Can be Optional for software licensing. | GPS Coordinates |

TABLE 2-continued

Procurement Request Variable Matrix

| Variable | Variable Type | Input |
| --- | --- | --- |
| Contract Duration | Mandatory | The duration of the contract in years, months or days |
| Commencement Date | Mandatory | The effective date of the contract |
| Procurement Type | Mandatory | Sole Source/Selective Competitive/Open Bid |
| Payment Method | Mandatory | Lump Sum/Cost Plus/Time Unit Rate/Work Unit Rate |
| Scope Details | Optional | Any additional details related to the nature of work |
| Bidders List | Optional | The user can specify open bidding strategy preference or specific list of bidders. If no input is given, the system can determine the list based on the Bidder Selection module. |
| Evaluation Criteria | Optional | Weighted Evaluation/Lowest Bidder. If no input is given, the system can determine the best strategy |
| Solicitation of Interest | Optional | The user can deactivate the SOI module based on his preference |
| Prequalification Requirement | Optional | The user can be able to specify whether or not prequalification is needed and may provide a technical questionnaire if available. |
| Financial Qualification | Optional | The user can specify whether the financial qualification module is to be executed or not. |
| Bidding Strategy | Optional | Open Bidding, Selective Bidding, or Ad Hoc Bidding |
| Hypothetical Quantities | Optional | Specified by the user |

The set of variables listed in Table 2 can be expanded, and other variables can be added based on NLP analysis. For example, the requestor can instruct the system to eliminate contractors who declined a bidding in previous similar procurements. Additional specifications can be translated into a special variable that can be added to the matrix where other matrices are subsequently modified, such as the bidders list matrix. The procurement request variable matrix can be dynamic, and additional variables can be added and linked to relevant modules accordingly.

Figure 5:
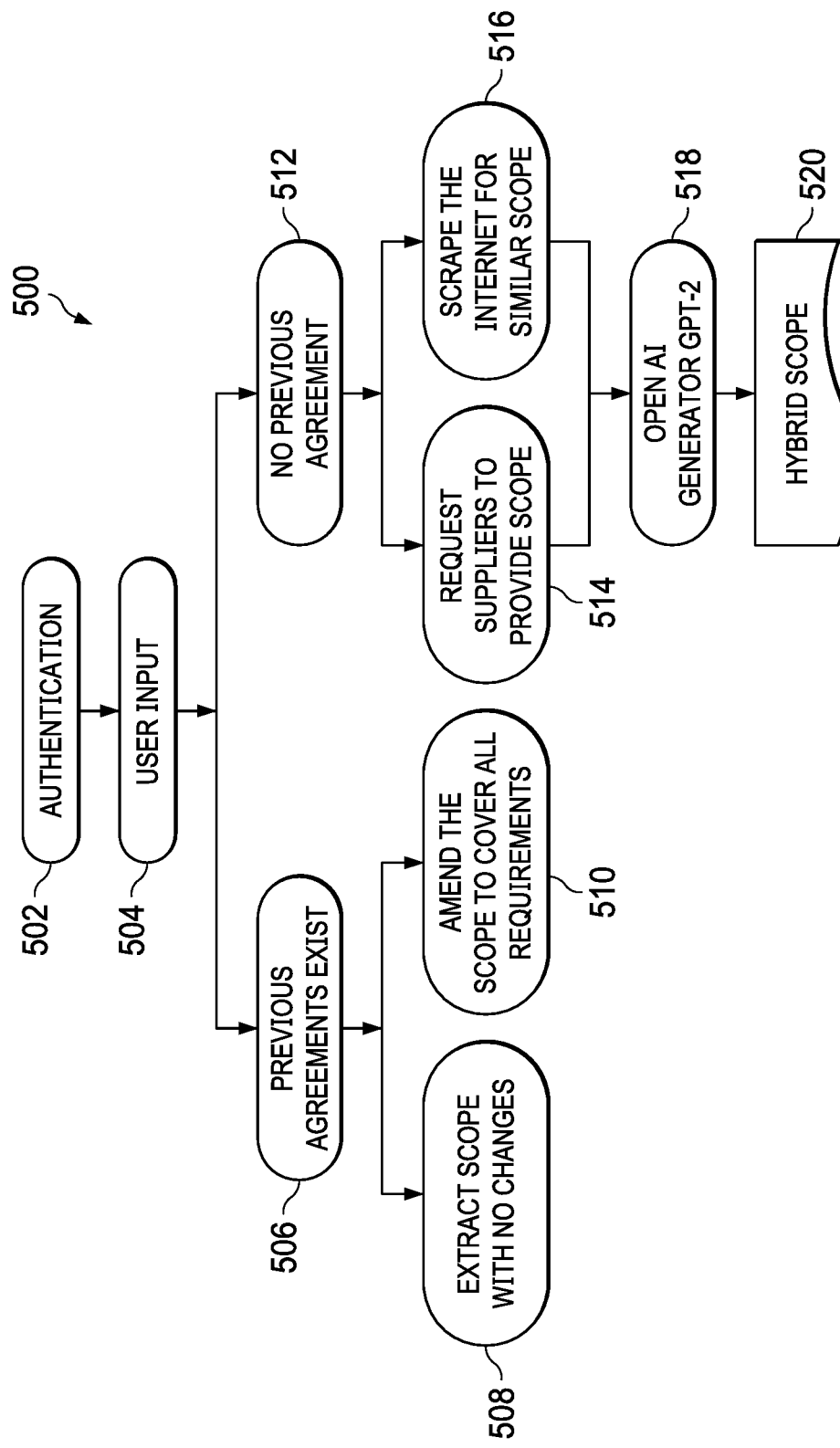
FIG. 5 is a block diagram showing an example of a workflow for scope of work development, according to some implementations of the present disclosure.

FIG. 5 is a block diagram showing an example of a workflow 500 for scope of work development, according to some implementations of the present disclosure. After authentication 502 has been performed, user input 504 of the variables listed in Table 2 can trigger a decision tree algorithm represented by the workflow 500. In an example, the user can indicate that the requested service is a replacement procurement for Janitorial Services. Using its attention block mechanism, BERT can detect the word "replacement," fill in the matrix of variables (such as those listed in Table 2), and trigger a relevant decision tree. When the contract type is "replacement procurement," for example, a corresponding pro forma agreement can be determined to be available in a repository of old agreements. The system can maintain a repository, for example, of all procured agreements (for example, in Word format). Once a relevant agreement is identified, special requirements or changes can be processed. For example, if the user has identified an additional scope requirement of outdoor glass cleaning, the system can amend the existing agreement to include this requirement. These steps correspond to the workflow 500 steps indicating that previous agreements exist 506. Then, depending on the requirements, the decision tree can proceed with an exact scope with no changes step 508 or amend the scope to cover all requirements task 510.

The existing agreement may have been developed by the APS system, or procured by a professional (for example, in a legacy system). When the original agreement is created by the system, scope changes can be immediately implemented. On the other hand, when the contract is procured by a professional, the system can find a suitable location to add the new requirement using unsupervised machine learning techniques. These techniques can allow the algorithm to act on the information without prior guidance.

The structure of the pro forma agreement created by the system can follow a specific outline, where the general terms and conditions are segregated from the specific scope of work. The general terms and conditions can be uploaded in a library where standard templates are stored based on the relevant category of product or service.

When no previous agreement exists 512, suppliers can be requested to provide scope 514, or the Internet can be scraped for a similar scope 516. An AI text generator 518 can be used to create the hybrid scope 520 of the requirements for the current agreement.

Figure 6:
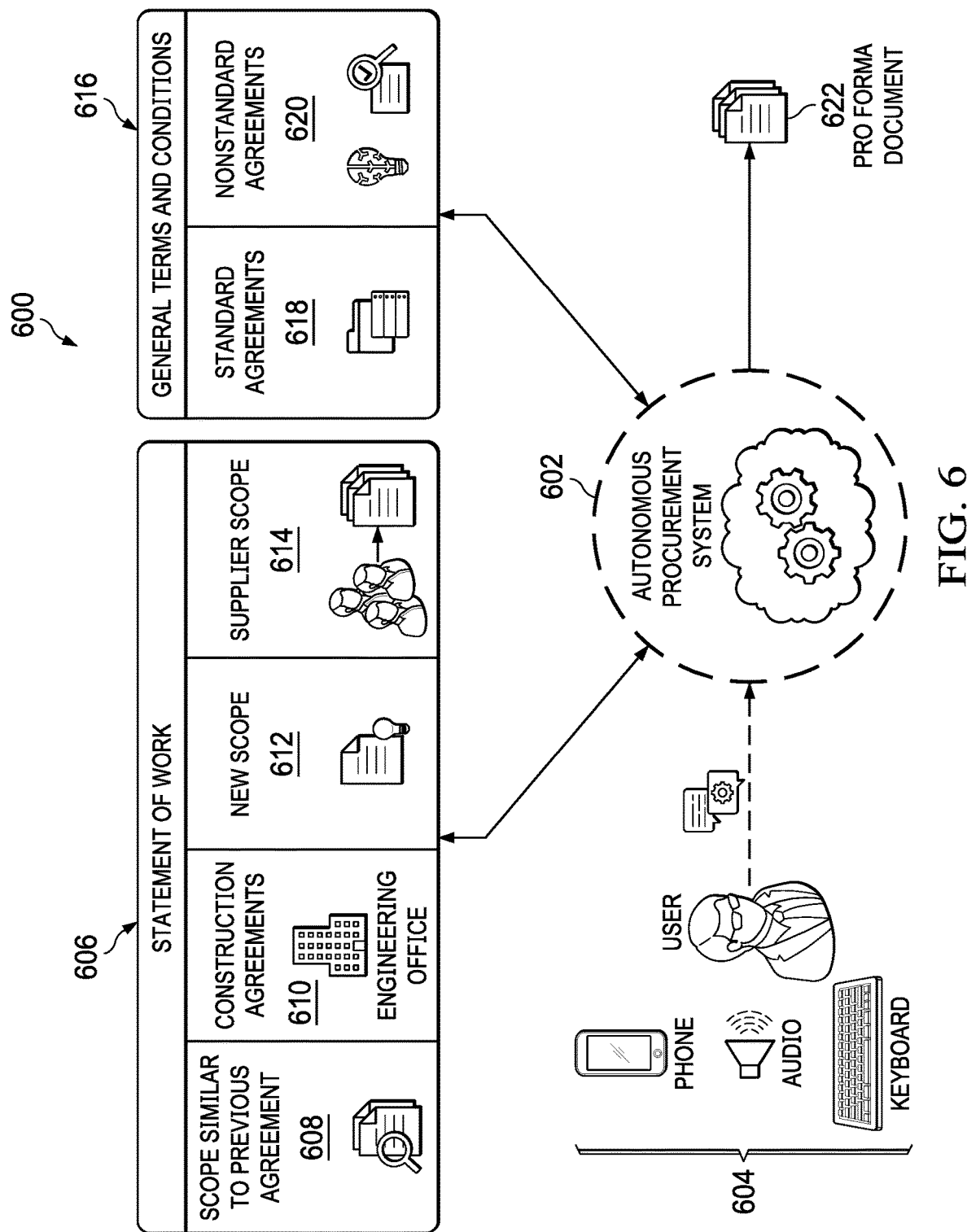
FIG. 6 is a block diagram showing an example of a workflow for processing in a pro forma development module, according to some implementations of the present disclosure.

FIG. 6 is a block diagram showing an example of a workflow 600 for processing in a pro forma development module, according to some implementations of the present disclosure. The workflow 600 can use an APS 602, for example.

The workflow 600 can represent cases in which the procured service or product are new in nature and previous similar agreements do not exist in the repository. In these cases, the APS 602 can scrape the Internet and find scopes of work similar to the user's requirements 604 associated with a statement of work 606. The similar scopes can include scopes that are similar to previous agreements 608, construction agreements 610, new scopes 612, and supplier scopes 614. The APS 602 can use the collected information as training data to be fed into the AI Text Generator GPT-2 to process and create a relevant statement of work 606. Relevant general terms and conditions 616 can be added from the system's library. The relevant general terms and conditions 616 can include standard agreements 618 and nonstandard agreements 620. The various APS instances described in the present disclosure, including the APS 102 and the APS 602, for example, can be the same APS.

In an example, the user can request the system to perform the following procurement: "I would like to procure a maintenance contract for the fire system in North Park Building in Dhahran." The system can require the user to input all mandatory variables in accordance with the previously described matrix (Table 2—Procurement Request Variable Matrix). After that, the system can search for the key words "fire system" and "maintenance" in the repository. If no similar scopes were found, the system can scrape the Internet and find similar scopes of work to input as training data into AI Text Generator GPT-2 for processing. Finally, the system can create a suitable scope of work along with the relevant terms and conditions. As the system is deployed by more organizations, the database can have a wider range of agreement types and scopes of work that can be utilized across multiple organizations. This feature can be applicable when the notion of an e-marketplace is well established. The final result is that the APS 602 can output a pro forma document 622 based on the requirements of the statement of work 606.

Figure 7:
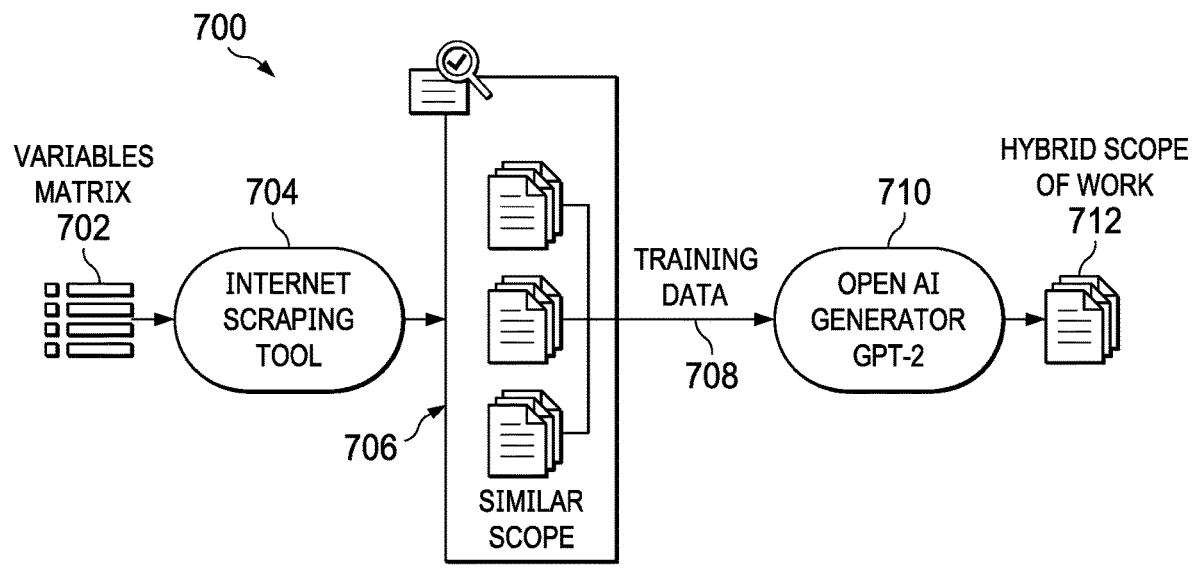
FIG. 7 is a block diagram showing an example of a workflow for developing new scope, according to some implementations of the present disclosure.

FIG. 7 is a block diagram showing an example of a workflow 700 for developing new scope, according to some implementations of the present disclosure. The workflow 700 can be used, for example, when the system is not able to find similar scopes of work on the Internet, such as in the case of new technologies. The user may have a brief idea about the scope requirements but may lack the technical details. The user's requirements can be captured in a variables matrix 702. An Internet scraping tool 704 can be used to solicit similar scopes 706 from potential bidders that are similar to the requirements in the variables matrix 702. Unlike the usual sequence of the procurement process in APS, the system can first identify potential bidders then begin acquiring the technical details for the scope of work. The similar scopes 706 of the potential bidders can be used as training data fed into an Open AI Text Generator GPT-2 710 to produce a hybrid scope of work 712.

Figure 8:
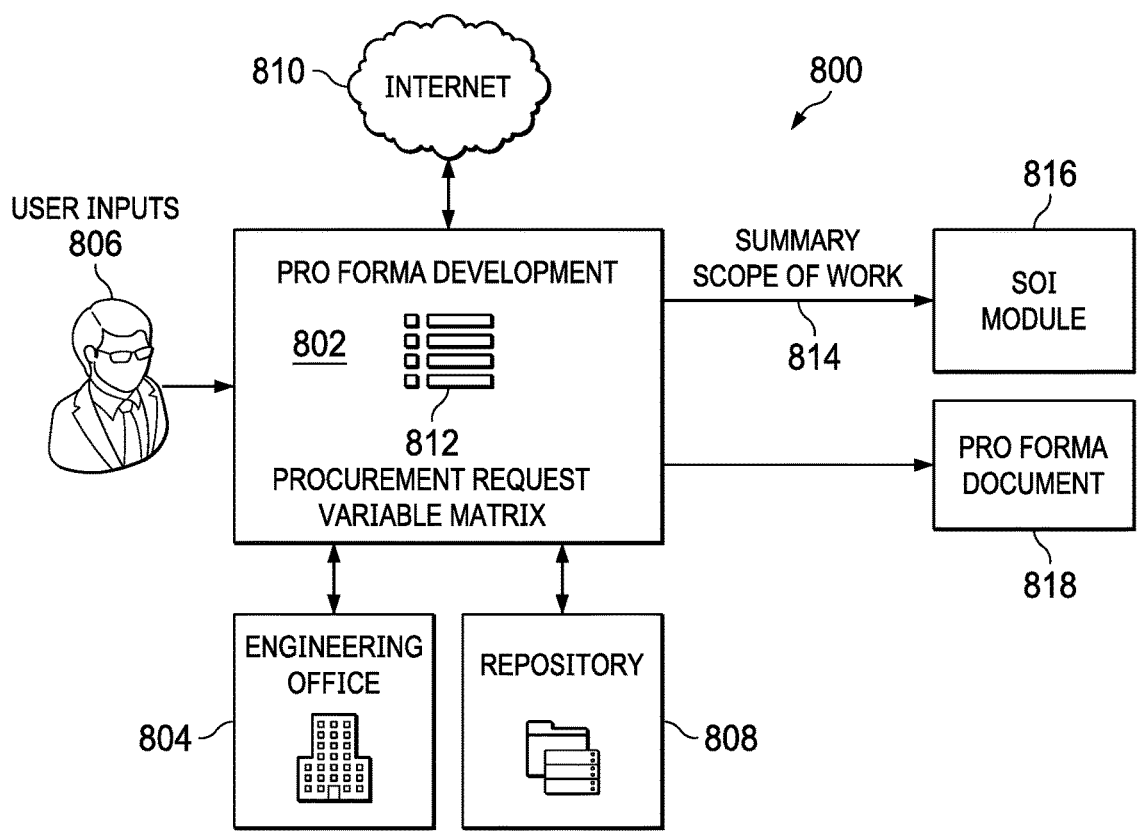
FIG. 8 is a block diagram showing an example of a workflow for a pro forma development module, according to some implementations of the present disclosure.

FIG. 8 is a block diagram showing an example of a workflow 800 for a pro forma development module 802, according to some implementations of the present disclosure. For construction projects, for example, the design information and specifications that constitute the statement of work can be provided by an engineering office 804. The pro forma development module 802 can also use user inputs 806, a repository 808 (for example, containing scope information), a procurement request variable matrix 812, and scraped information from the Internet 810. The output of the pro forma development module 802 can include a summary scope of work 814 (provided to an SOI module 816) and a pro forma document 818.

One of the essential elements for any pro forma document, in addition to the scope of work and standard terms and conditions, is the commercial form where the rates of the agreement are provided. The system can create the commercial form based on the user's input. The payment method can be, for example, lump sum, time unit rate, work unit rate, or cost plus. When the contract is a replacement agreement or includes a lump sum payment method, the commercial form can be easily developed. For time unit rate and work unit rate payment methods, a finite set of pay items may not be identifiable. In this case, the model can learn the semantics of the scope, then use the semantics to extract the pay items and suggest new ones based on certain labels and tags. Words such as daily, weekly, and monthly can help to identify time unit rate pay items, while noun phrases that represent work elements can be extracted to develop work unit rate items. Deep learning algorithms, or BERT, can be employed to extract the commercial form from unstructured text. This can include tagging the scope of work document by extracting noun phrases and building trees representing their relationships. The decomposition of the scope can result in a set of phrases that can represent or define a pay item. The model can analyze whether the phrases can be considered as a pay item or not by applying a deep learning architecture that has been trained on a labeled training set. The resulting commercial form can be in spreadsheet format that can be used later to conduct commercial evaluation and payment processes.

Supplier Registration

Figure 9:
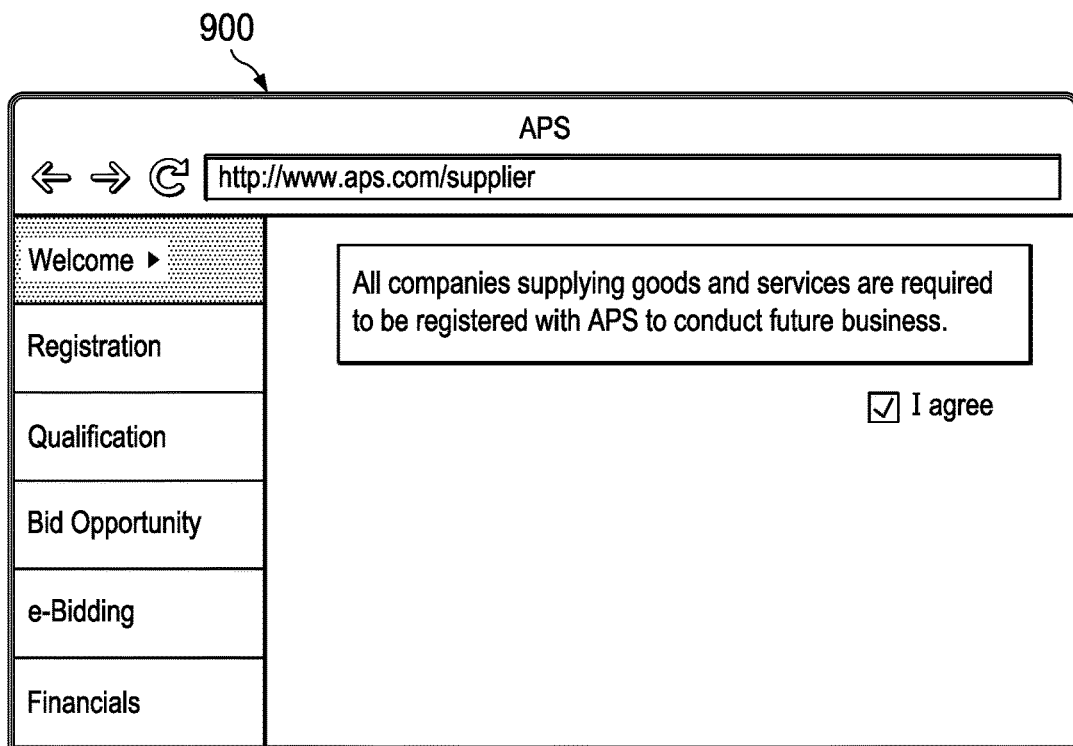
FIG. 9 is a screenshot of an example of a new supplier web page, according to some implementations of the present disclosure.

FIG. 9 is a screenshot of an example of a new supplier web page 900, according to some implementations of the present disclosure. The new supplier web page 900 can support a supplier registration process that includes creating supplier accounts in which records collection and procurement transactions are carried out. In order for the supplier to register, the supplier can visit the new supplier web page 900 and initiate the registration process. Additionally, the system can send invitations to identified potential suppliers (for example, using a bidders selection module) with registration instructions to create a supplier account. Supplier databases can maintain a record of registered suppliers and invited supplier. A database schema can be constructed using the supplier general information such as the supplier's commercial license number, list of owners, certificates, financial data, and any other requirements necessitated by an organization. The new supplier web page 900 can be developed and implemented using a suitable programming language (for example, PHP or C#). Microsoft Standard Query Language (SQL) Server or a similar database management system can be used to manage supplier records.

During the registration process, the supplier can be mandated to enter the minimum required fields to create a unique record and assign a supplier number in the system. After the supplier completes the fields and submits the request, the system can create a supplier number and send a one-time password to the supplier to activate the supplier's account. This activity, as well as subsequent procurement communication with the suppliers, can be implemented using blockchain technology. The process can be autonomous, and the supplier number can be assigned to the supplier without human intervention.

Figure 10:
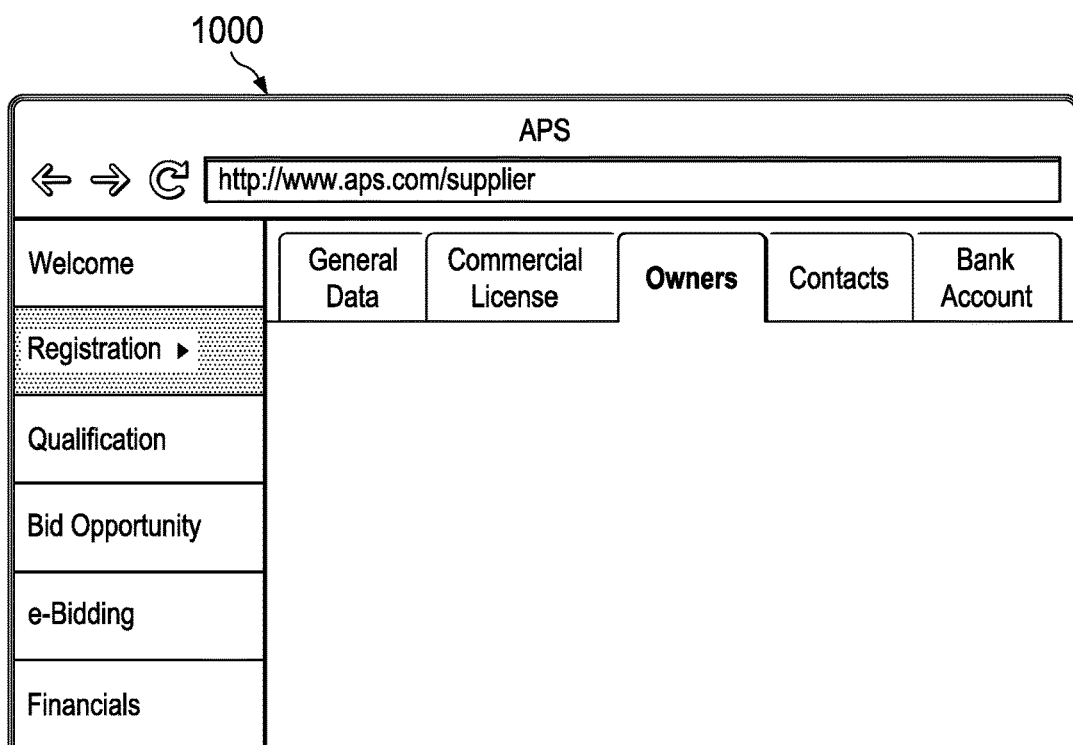
FIG. 10 is a screenshot of an example of a supplier registration data web page, according to some implementations of the present disclosure.

FIG. 10 is a screenshot of an example of a supplier registration data web page 1000, according to some implementations of the present disclosure. The supplier registration data web page 1000, accessible after supplier account creation, can provide the supplier with a designated web page through which all communications with the supplier occur. This can include receiving solicitation of interest requests, invitations for proposals, and clarification responses.

Figure 11:
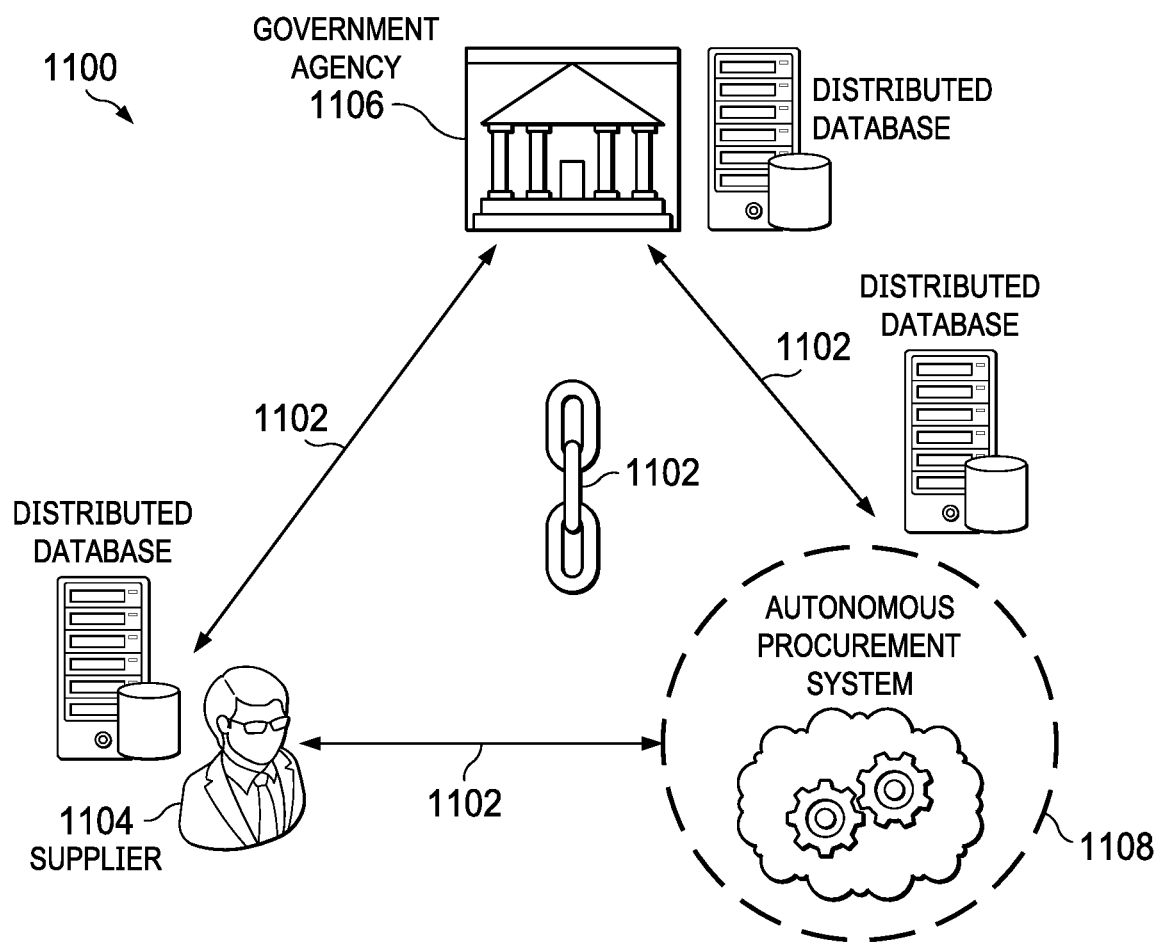
FIG. 11 is a block diagram showing an example of a process flow for supplier registration and blockchain transactions, according to some implementations of the present disclosure.

FIG. 11 is a block diagram showing an example of a process flow 1100 for supplier registration and blockchain transactions 1102, according to some implementations of the present disclosure. The process flow 1100 can be used as a cloud solution serving as a single hub between all participants and allowing shared record-keeping between the registered parties.

During the process of supplier registration, for example, data verification can be essential for ensuring that the records of a supplier 1104 are valid. Supplier data may contain inconsistencies, errors, and out-of-date information, which can ultimately result in exposing the organization to additional risk. Securing the verification step of the process can be done in various ways.

A first technique can request the supplier 1104 to confirm the accuracy of supplier-entered data and can identify the legal consequences for submitting invalid information. With this technique, the verification occurs at the supplier 1104 side rather than being performed by the system.

A second technique can be used when, for example, the concurrence of the supplier 1104 to bear the legal liability for submitting false information is insufficient. In this technique, verification of the supplier input can be conducted by sending verification requests to an applicable government agency 1106. Machine learning algorithms can be used to extract and classify the data that needs verification. Then a request can be sent to a corresponding agency to verify the information.

With the concept of the e-marketplace, verification of the data can be spontaneous, and alteration of the data can require the consensus of the other party. Blockchain network principles, using hyperledger algorithms for example, can be deployed in this solution. The integration of all parties such as suppliers, accounting firms, registration agencies, and government entities, can streamline the accessibility and verification of the supplier data. The system can act as a single hub for all entities, which can ensure the compliance of continually changing regulations and policies. In this way, an APS 1108 can be developed without the notion of an e-marketplace, since the solution entails adoption by all stakeholders.

Figure 12:
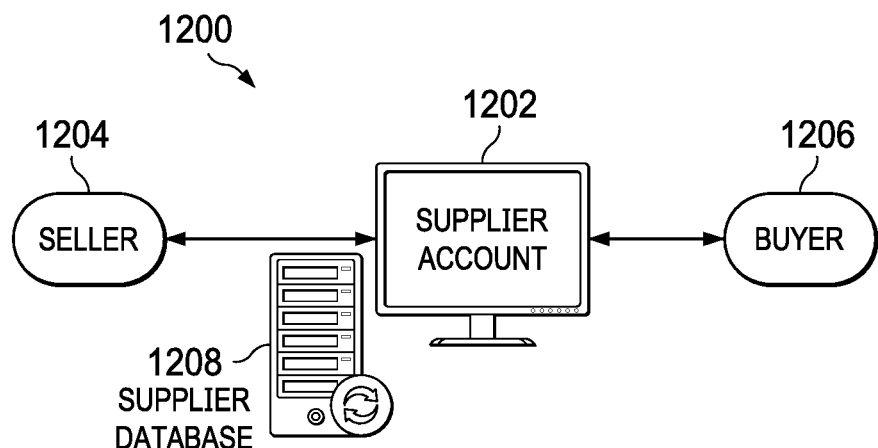
FIG. 12 is a block diagram showing an example of interactions for shared supplier records, according to some implementations of the present disclosure.

FIG. 12 is a block diagram showing an example of interactions 1200 for shared supplier records, according to some implementations of the present disclosure. The interactions 1200 involve the use of a supplier account 1202 that links sellers 1204 and buyers 1206. Supplier accounts 1202 can be stored in a supplier database 1208.

Bidders Selection

Figure 13:
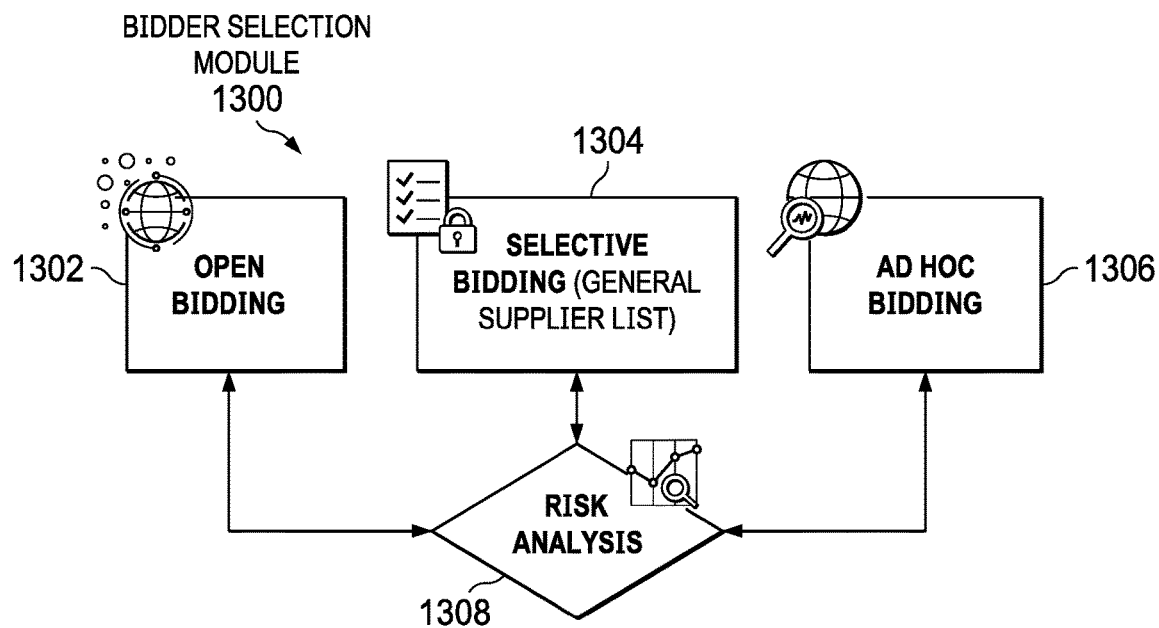
FIG. 13 is a block diagram showing examples of bidding strategies of a bidder selection module, according to some implementations of the present disclosure.

FIG. 13 is a block diagram showing examples of bidding strategies of a bidder selection module 1300, according to some implementations of the present disclosure. At least three different basic strategies can be used in determining bidders: open bidding 1302, selective bidding 1304, and ad hoc bidding 1306. The bidding strategy to be used for a given procurement can be determined and triggered during the creation of a procurement request. One of the variables of the initial procurement request variable matrix is the procurement type, which defines the bidding strategy. For each bidding strategy, a different scenario can occur, as follows.

Before finalizing the bidders list, a risk analysis 1308 can be conducted by the system. The risk analysis 1308 can include performing a comprehensive search using Internet scraping for negative phrases associated with a bidder. Negative phrases can be associated with risks such as bankruptcy, court orders, lost cases, and debts. The risk analysis 1308 can determine each supplier's overall risk status. Natural language processing and web scraping technologies can be used for the risk analysis 1308.

Open Bidding

When open bidding 1302 is specified in the procurement, the system can post an announcement on each buyer's web page in addition to an invitation open to the public domain for potential bidders interested in participating in bidding. The announcement can be created by the system using a standard template in which certain variables are exported from the procurement request such as location, effective date, and duration. A summary of the scope of work can also be provided to potential bidders. In some implementations, the Procurement Pro Forma Development Module can use the AI Text Generator GPT (or a similar Machine Learning algorithm) to create a summary of the scope of work. Another option is to upload the pro forma document (created by the Procurement Pro Forma Development Module) in its entirety, unless special concerns exist regarding confidentiality. General instructions, such as supplier registration requirements, can be published with the announcement on a web page. The integration between the website announcement and the procurement system can be done with various applications such as PHP and MySQL. For any supplier who is interested in bidding, registration can be required, and a supplier number and an access account can be created. The supplier registration can provide the supplier with an access account. Communications between the system and the supplier can include identification of the supplier account.

Figure 14:
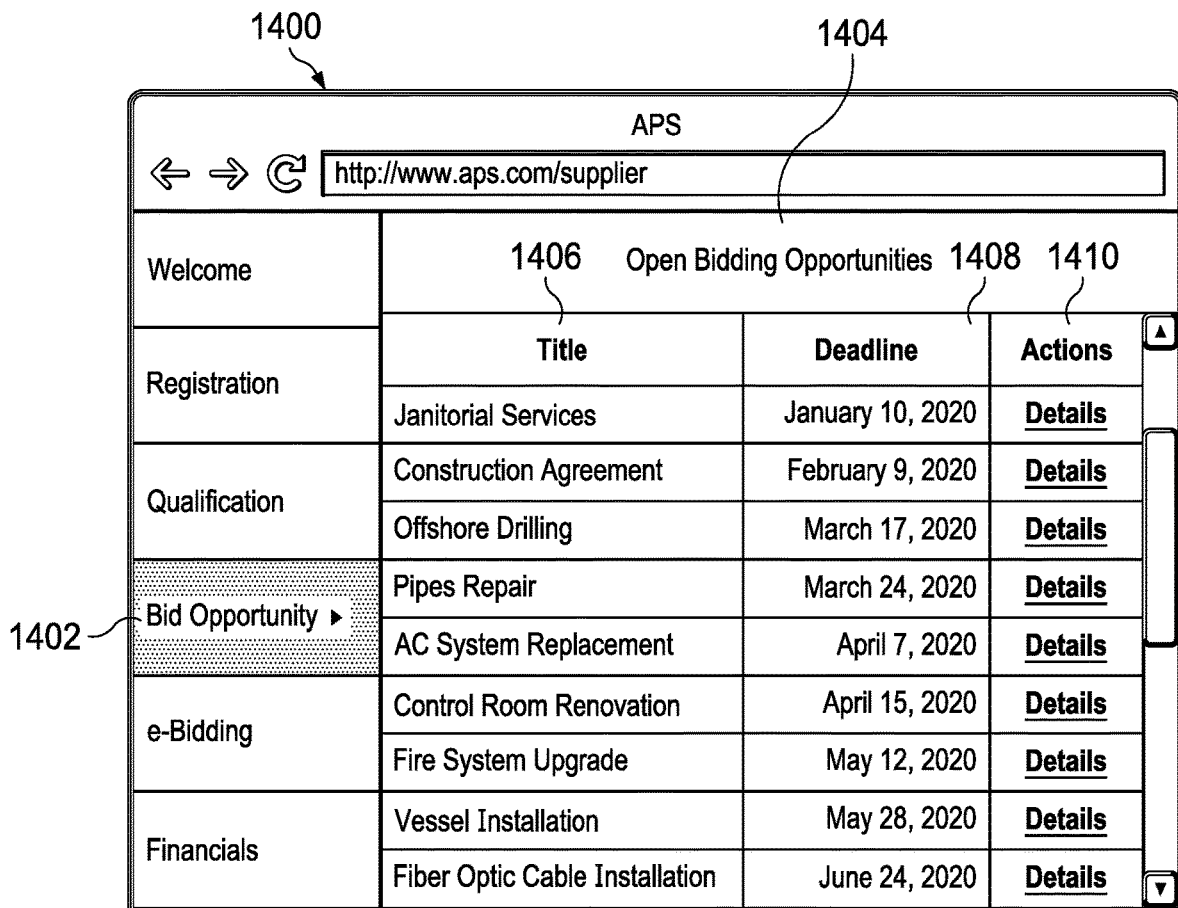
FIG. 14 is a screenshot of an example of an open bidding supplier view, according to some implementations of the present disclosure.

FIG. 14 is a screenshot of an example of an open bidding supplier view 1400, according to some implementations of the present disclosure. The open bidding supplier view 1400 can be a web page used by suppliers who are interested in participating in the bidding. Suppliers can navigate to their account and click on a "Bid Opportunity" button 1402. Then, a supplier can select the procurement on which the supplier is interested from the open bidding opportunities 1404. Each procurement that is listed can include a title 1406, a bidding deadline 1408, and an actionable details link 1410. Clicking on a given actionable details link 1410 can automatically display one or more additional screens in which detailed information about the procurement is provided and supplier actions can occur (for example, to bid).

Selective Bidding

Selective bidding 1304 can be used when the bidders have been identified by the system. The registered suppliers list can be used to identify bidders whose registrations reflect services (performable/offered by the bidders) that are relevant to the scope of work of a procurement on which bidding is to occur. To automate this task, the system can parse the scope of work and use machine learning algorithms to identify applicable fields of service. The system can enhance this step for future procurements by refining the suppliers list based on previous performance. A suppliers performance module can be used to create the bidders list. Other predefined filters can be introduced, such as the maximum number of bidders and other conditions consistent with the buyer's contracting policies.

Ad Hoc Bidding

Ad hoc bidding 1306 can be used when potential bidders are to be determined by surveying the market. This can occur when there are no known bidders who are capable of delivering the requirements of the procurement. This strategy can be used when there are no registered suppliers that have been identified for a certain scope. In this case, the system can scrape the Internet using one scraping software to identify the potential bidders. The system can then create predictions (for example, predicted supplier compliance and success) based on its search and recommend the potential bidders that can participate in the tendering. Machine learning tools such as BERT can be used to set up the Internet scraping process. Reinforcement machine learning can improve the module performance over time by also considering historical data. An invitation can be sent to the potential bidders to complete their registration and obtain a supplier account.

Solicitation of Interest (SOI)

When either selective bidding or ad hoc bidding is used, a solicitation of interest can be sent to bidders to confirm their interest. This action can be triggered based on predefined criteria during the configuration of the system. Also, the user can optionally deactivate this feature by instructing the system not to issue SOIs. The procurement request variable matrix can include the SOI element as one of its variables. This variable can be applicable by default in case of selective bidding and ad hoc bidding, however being not applicable in case of open bidding. If a requestor wishes not to issue an SOI, the requestor can state during the initiation of the request that the SOI is not needed, causing deactivation of the SOI step. The system can be configured so that SOIs occur after completing the bidder list.

Solicitations of interest can take two forms: simple SOIs and SOIs with a prequalification evaluation. In the first form of the SOI, the purpose of the simple SOI is merely to solicit supplier interest. Suppliers who respond positively can remain in the bidder list. Suppliers who do not respond or who respond negatively can be excluded from the bidder list. In the second form of the SOI, a request can be made to interested bidders to submit a prequalification proposal. The criteria for selecting the applicable SOI form can be based on predefined buyer policies and procedures. As a default criteria for the system, an ad hoc bid slate can trigger the SOI with a prequalification request for services procurement. There can be some exceptions, such as in the case of acquiring standard material where technical prequalification is not required. Conversely, in selective bidding, the requestor has the option to request a prequalification or not.

The SOI message can be in a standard letter format that provides basic information about the proposed procurement including the effective date, the duration, and the summary of the scope of work. The information to be inserted in the SOI can be obtained from the procurement request variable matrix. A summary of the scope of the work can be imported from the pro forma development module. The summary can also specify a deadline for the reply. The deadline can be a predefined duration (for example, 10 days) or a longer duration, such as in the case of a technical prequalification requirement. The supplier allowable duration to respond can be a variable that is set in the procurement request variable matrix.

Figure 15:
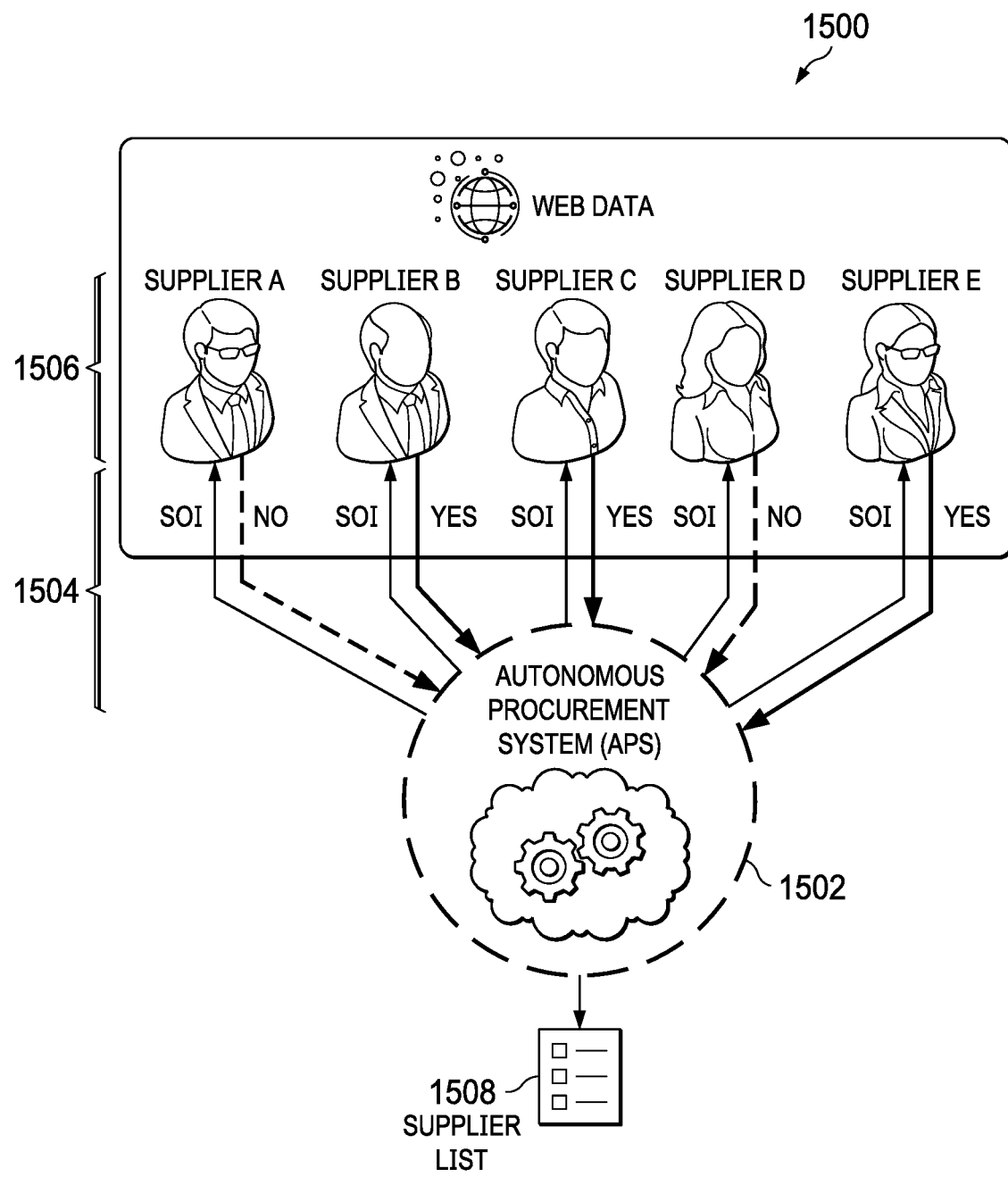
FIG. 15 is a block diagram showing an example of a system in which solicitations of interest are sent to suppliers, according to some implementations of the present disclosure.

FIG. 15 is a block diagram showing an example of a system 1500 in which solicitations of interest are sent to suppliers, according to some implementations of the present disclosure. For example, an APS 1502 can send SOIs 1504 to suppliers 1506. Each SOI 1504 can be sent to a supplier 1506 through the supplier's account, and an email notification can be triggered. If the supplier 1506 is not registered in the system, such as in the case of the ad hoc bid slate, instructions can be sent to the supplier's available contact information to complete the supplier's registration for a subsequent response later through the supplier's designated account. A general description of the scope can be presented to the suppliers 1506 with a timeframe to solicit the supplier's interest in the bidding. The SOI 1504 can be implemented as a smart form in which responses can be captured against each question separately. The interested supplier 1506 can respond by clicking a button indicating interest or another button indicating declination. If the button indicating declination is selected, the supplier can be excluded from a supplier list 1508. In case that prequalification is required, the prequalification questionnaire along with the instructions can be available for response by the supplier. Accordingly, an exclusion from the supplier list 1508 can be subject to the prequalification evaluation which can take place under a prequalification evaluation module. An SOI module can be developed with Python or any other compatible programming language.

Prequalification Evaluation

The prequalification evaluation can be necessary to reassure that the supplier has the minimum capacity and capability levels, and thus may be a potential bidder. This task can be triggered for certain procurements by default or at requestor discretion if specified. One of the variables in the procurement request variable matrix is the prequalification evaluation requirement. If the prequalification evaluation is set to required, the system can trigger this task. The task can also be triggered as a result of issuing the SOI.

Figure 16:
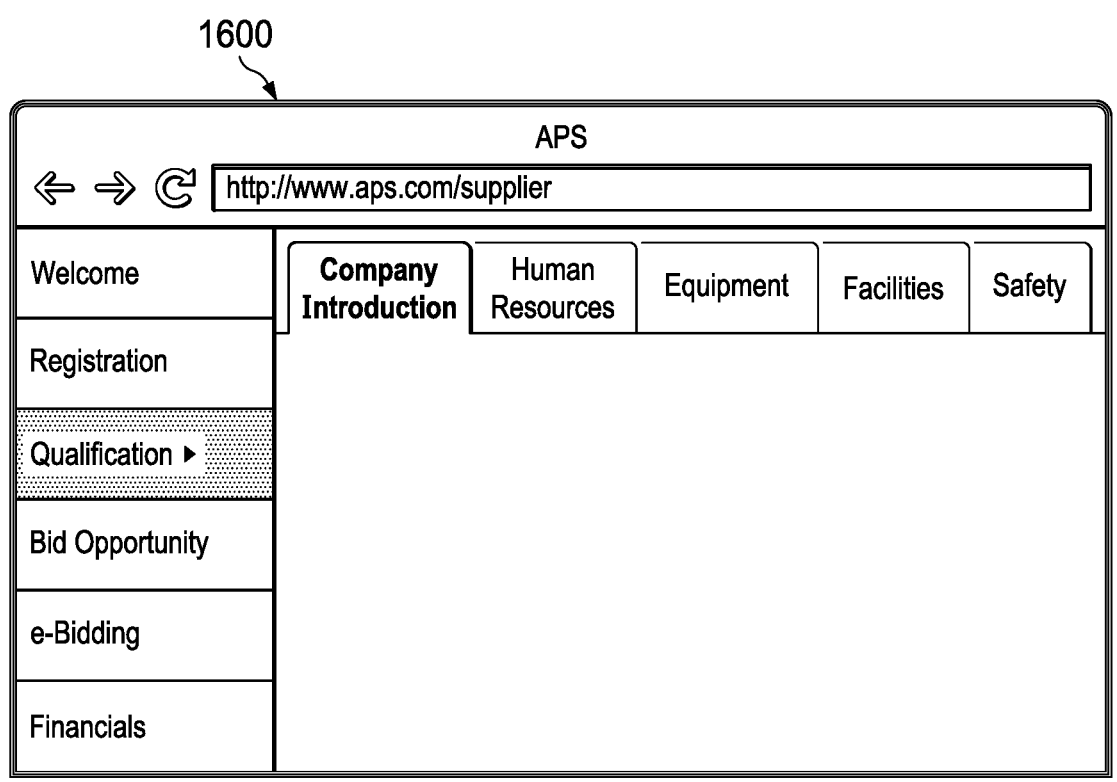
FIG. 16 is a screenshot showing an example of a supplier qualification profile web page, according to some implementations of the present disclosure.

FIG. 16 is a screenshot showing an example of a supplier qualification profile web page 1600, according to some implementations of the present disclosure. The supplier qualification profile web page 1600 can be used for defining prequalification data, including general information about the supplier which can be captured during the registration process. The prequalification data can be updated by the supplier when needed (instead of filling the same information for every procurement requiring an SOI). This information can include information about the company's scope, human resources, equipment, facilities, experience list, safety, and quality management.

Figure 17:
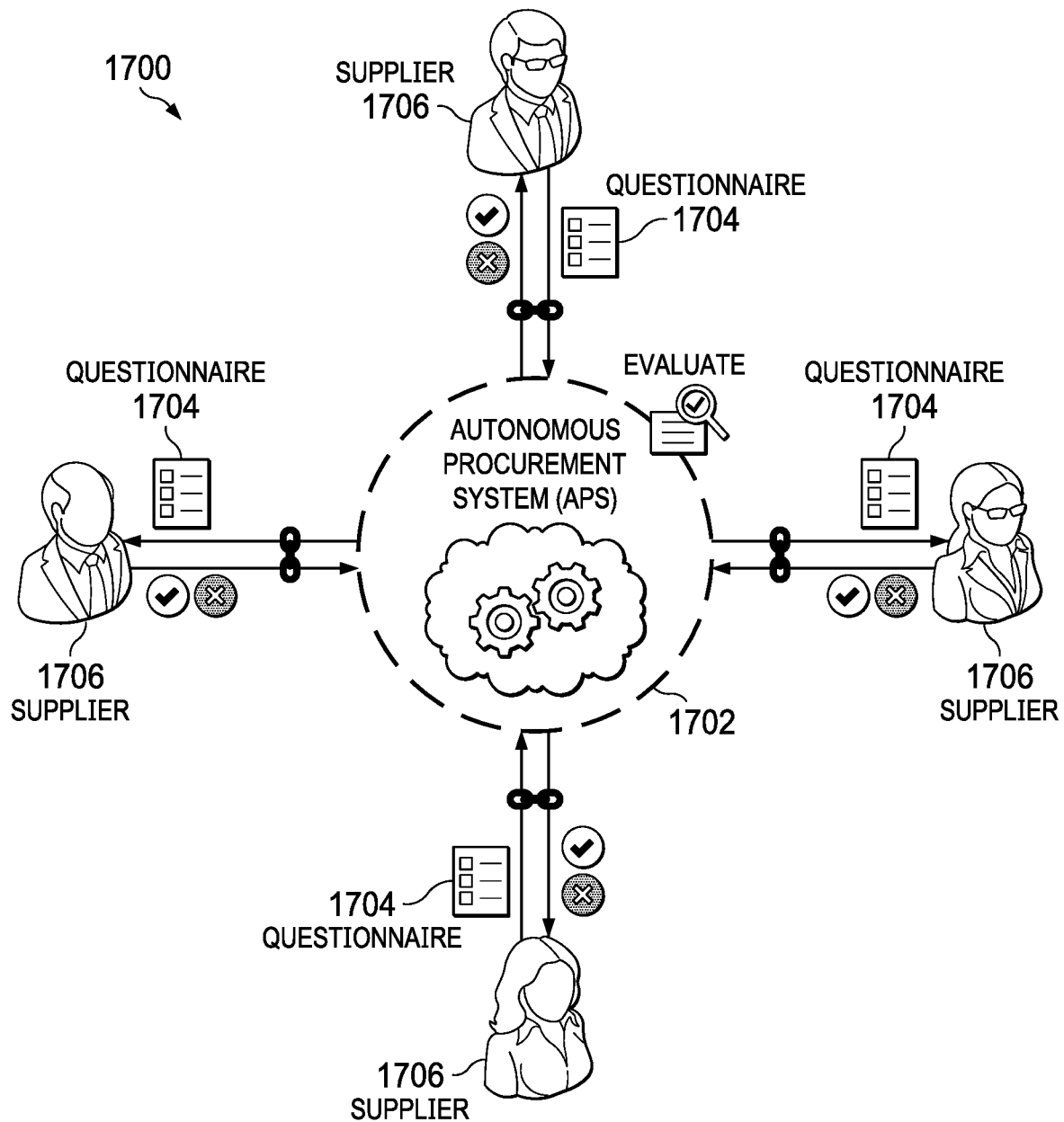
FIG. 17 is a block diagram showing an example of interactions of a prequalification evaluation module, according to some implementations of the present disclosure.

FIG. 17 is a block diagram showing an example of prequalification questionnaire system 1700, according to some implementations of the present disclosure. An APS 1702 can send questionnaires 1704 to suppliers 1706, for example, using blockchain technology. The APS 1702 can evaluate the questionnaires that are returned in order to determine, for each supplier 1706, a level of prequalification.

Various versions of a predefined prequalification questionnaire can be loaded in the system in smart-form format, allowing a supplier to provide responses in the same form. Different templates that are most relevant to the theme or the scope of work can be automatically chosen by the system. The versions of the prequalification questionnaire types can include at least operation services, construction services, and material procurement. Based on the scope of work, the applicable version of the prequalification can be selected.

The prequalification questionnaire can be entirely quantitative, which can simplify the solution, especially when a weighting point system is used to conduct the evaluation. Predefined response categorization can be established along with the questionnaire development in which scoring is associated with a certain response range. Some of the evaluation criteria can be based on procurement request variables such as the estimated proposed procurement value and supplier previous agreements or manpower. A minimum predefined passing score can determine successful versus non-successful suppliers. In the case of an ad hoc bidder list, relative evaluation can be applicable where suppliers can be ranked against each other rather than simply using scores.

The prequalification questionnaire can be sent to the supplier using the supplier account. For example, the supplier can fill in and submit the prequalification questionnaire, which can be checked by the prequalification evaluation module. The result of the evaluation can exclude failed suppliers from the bidder list.

In a more advanced version of the prequalification evaluation, the buyer can be provided with the flexibility to amend the prequalification questionnaire to include special questions. Some questions can highlight necessary requirements in which pass or fail scoring can be assigned against such questions. These questions can be captured in the procurement request variable matrix. The system can prompt the user with the prequalification requirement options. If the user elects to proceed with a prequalification version of the process, the most relative template can be provided to the user, and the user can be given the option to add an additional questionnaire. The questions inserted by the user can be appended the standard prequalification questionnaire. More sophisticated scenarios can be developed within the same concept depending on the buyer's procurement policies and procedures. Supervised learning algorithms or other suitable techniques can be used to provide the correct output based on a previously-analyzed dataset.

Authenticating the responses can include confirming the accuracy of the submittal and assigning legal accountability on the supplier in the case of submitting invalid data. In implementations using blockchain network principles (for example, using a Hyperledger algorithm), the authentication among various suppliers' records can be automated. Previous experience or awarded contracts can easily be verified in e-marketplace cases.

Financial Qualification Evaluation

Financial qualification evaluation can be triggered for certain procurements based on predefined criteria, such as for lump sum construction procurement in which the estimated value of the procurement is more than $1 MM. This activity can be skipped for certain procurements, especially when the financial risk is minimal. The criteria for mandating the financial qualification evaluation as a default requirement can depend on the buyer's procurement policies. In addition, the requestor can also trigger the financial qualification request when initiating the procurement request, even if the company's predefined default criteria does not require financial qualification. In this case, the financial qualification evaluation variable in the procurement request variable matrix can be modified from "not applicable" to "required."

When financial qualification evaluation is required, a message can be sent to the suppliers of the bidders list requesting them to fill out a financial evaluation form. The financial qualification evaluation form can be a spreadsheet in which the supplier can input various elements such the assets, liabilities, operating earnings, and revenues. After submitting the financial numbers, the system can request the supplier to confirm the accuracy of the numbers, and the system can state the legal implications for submitting false information. Once these variables are entered, the financial qualification evaluation module can run calculations based on predefined financial ratios such as profitability ratios, liquidity, efficiency ratios, and debt ratios. Based on the provided financial ratios, predefined criteria can be used to determine if the supplier is financially qualified. The analysis can take into account the estimated procurement value and the procurement duration. If the supplier is not financially qualified, then the supplier can be excluded from the bidder list. The bidder list can show all suppliers, and an indicator can indicate if the supplier is excluded or not. The reason for the exclusion can be maintained in the bidder list table.

In some cases, a determination can be made that the concurrence of the supplier to bear the legal accountability for submitting false information is insufficient. Then, the authentication of the financial inputs can include requesting the supplier to submit a copy of their formal financial statement that has been authenticated by an authorized accounting firm through the supplier account. The submitted financial statement can be analyzed using a machine learning algorithm such as BERT or similar algorithm to extract the essential variables and calculate the ratios. The same standard qualification evaluation form filled out by the supplier can be completed by the trained machine learning algorithm and the evaluation process, and the subsequent actions can occur in the same fashion as if the supplier had filled the form.

A third option for the module is to receive the input or the financial statement directly from the accounting firm. In some implementations, financial accounting firms can be registered to conduct this activity, and the supplier can be given the option to select from the available registered firms. Once selected, the accounting firm can be provided with the same smart form to input the various financial elements of the supplier. This option can work efficiently if the system is built with the notion of e-marketplace where accounting firms and governmental agencies are connected to a platform built with blockchain technologies. For example, blockchain networks can be developed using Hyperpledger Fabric or similar software. Modules can be fully automated without requiring third-party input to determine the financial standing of a supplier, but instead using real-time data. For example, the term real-time can correspond to data that is updated or refreshed within a specified period of time, such as daily or within hours, minutes, or seconds.

In some jurisdictions, the awarded supplier can be requested to submit a performance bond. In such cases, financial evaluation is not required. The system can capture the performance bond in the agreement record.

Invitation for Proposals

Figure 18:
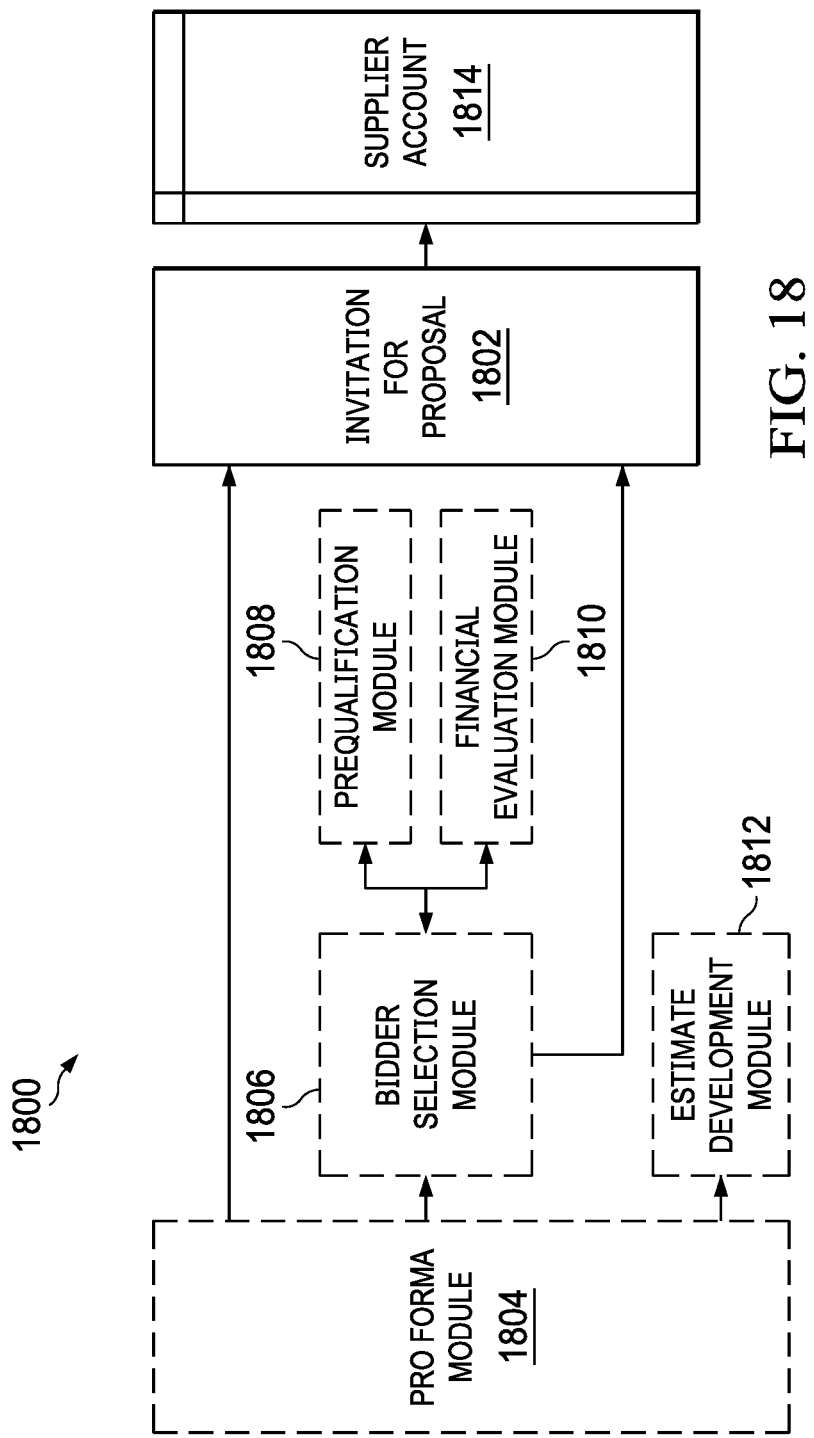
FIG. 18 is a block diagram showing an example of modules and outputs of an invitation for proposal, according to some implementations of the present disclosure.

FIG. 18 is a block diagram showing an example of modules and outputs of an invitation for proposal 1800, according to some implementations of the present disclosure. The invitation for proposal module 1802 can use inputs from a pro forma module 1804, a bidder selection module 1806, a prequalification module 1808, a financial evaluation module 1810, and an estimate development module 1812. The output of the invitation for proposal module 1802 can include updating a supplier account 1814.

For example, after the deadline of the SOI (if used), prequalification proposal (if used), and the financial qualification submittal (if used), the bidder list can be finalized and can identify bidders who responded and who have passed the prequalification evaluation and/or financial qualification. The system can send invitations to bidders through the supplier account. The invitation can be included in a standard letter with instructions such as a bid closing date. The pro forma document and the commercial forms developed by the pro forma module 1804 can be accessible to the bidder in his account. The general information about the procurement, such as the duration and the effective date, can also be available to the supplier and can be exported from the procurement request variable matrix. If technical evaluation is required, the technical evaluation form produced by the technical evaluation module can be also sent to the bidder.

Depending on the scope complexity, the system can determine the most applicable bidding period and can assign a bid closing date after which bids are no longer accepted from suppliers. When the user initiates the request, the system can prompt the bidder with the proposed bidding period. The user can be allowed to change this parameter in the procurement request variable matrix. A timer can be shown in the supplier account under the prospective procurement section.

After receiving the invitation and before the bid closing data, the bidder can submit a question through his supplier account for clarification. The question can be submitted and the system can run a natural language process algorithm such as BERT and machine learning to answer the question. The module can use linguistic keys to find the answers to the suppliers' queries. An unsupervised machine learning algorithm can also be used.

If the answer to the question is not satisfactory, or in exceptional cases, for example, the question can be sent to the procurement requestor. Based on a reply, the pro forma may change and the suppliers can be informed accordingly. Changes may be necessitated due to erroneous input received by the procurement requestor or if unrealistic requirements exist. The response of the requestor can be processed by the modification module. This task can provide quality assurance of the pro forma created by the system.

Estimate Development

Estimates that can be conducted include budgetary estimates and detailed estimates. A budgetary estimate can provide the buyer with a rough estimated value of the proposed procurement. Detailed estimates can include higher accuracy estimates used in setting the negotiation parameters. The reason for having two different estimates is because detailed estimates cannot be developed unless the final pro forma document is completed which usually takes a long time to develop. However, the APS can include a capability to create pro forma contracts autonomously and instantly in most cases, except when the suppliers are requested to submit their proposal of the scope of work, defeating the need to have a budgetary estimate. In some implementations, both budgetary and detailed estimates can be combined in one estimate. The system can have different scenarios to develop the estimates depending on the variables provided by the requestor in the procurement request.

If the procurement type as indicated in the procurement request variable matrix is a replacement procurement, then the system can take the existing prices and use them as a basis for developing the estimate. The prices can be adjusted by applying inflation factors using consumer indices. The indices can be imported directly from the Internet, for example. For example, a web site provided by the Department of Commerce in some jurisdictions can provide historical consumer indices for use in an estimating module. Extraction from the web site can be done using any suitable web scraping software. Accordingly, the system can create a spreadsheet that includes the existing rates from the line items of the commercial form, and the rates can be adjusted based on inflation rates. An inflation calculation algorithm can take into account old rates in addition to a future forecast of the inflation rates for the duration of the agreement. This technique can be enhanced by accounting for external factors such as demand and certain fundamental incidents. Determining incidents can be done, for example, by scraping news sources from the Internet using open source scraping tools such as Beautiful Soup or Scrappy. These tools can be invoked through Python. Relevant news can be determined using machine learning to extract relevant variables. The variables can be weighted to adjust estimates accordingly.

If the procurement is a new time unit rate or work unit rate procurement, then the estimate can be created by scraping the Internet and extracting relevant estimates. The estimates can be developed by finding time unit rates and work unit rates from the Internet. The rates can be filtered and adjusted based on inflation, geographic location, and currencies of similar service providers. For standard material items, the accuracy of the estimate can be very accurate, since the rates are available in most cases in the public domain and published in the Internet.

A challenge can exist in developing realistic estimates for lump sum project contracts when the work has never been done before. For this procurement type, parametric estimates can be applied based on Internet scraping used to determine prices of similar projects. Prices can be prorated proportionally based on the size of the proposed project. For example, if the proposed procurement is to build a hospital of 400 beds, then the system can scrape the Internet to determine the cost of building hospitals. The scraping can identify a large collection of hospital projects having different capacities (or a different number of beds), at different locations globally, and at different project construction times. The system analyze and filter the data points based on predefined rules in order to exclude projects from third-world countries or projects exceeding a predetermined age (for example, ten years). The data can also be adjusted by converting lump sums to costs per bed, since different projects can have different hospital capacities (numbers of beds). Each lump sum price can also be adjusted based on inflation. Finally, various statistical analyses can be conducted, and averages can be used to determine estimates.

Some implementations can include detailed estimates that can decompose the scope of work into its elements (for example, material, manpower, and equipment). The accuracy of such estimates may be challenging for some procurements since a wide range of assumptions may be present. For example, developing a detailed estimate for building a hospital can entail breaking the entire project into materials, manpower, and equipment. The quantity estimate of the materials can require decomposing the design and specifications to produce a bill of quantities. Autonomous detailed estimates can be more important to the bidder (when the supplier is developing the commercial proposal) than to the buyer. Detailed estimates for construction projects can be provided by the engineering office as an input along with the corresponding pro forma.

For cost plus procurement methods, estimates can be based on the actual cost plus the mark-up. The estimate of the actual cost can follow the above estimate scenarios. Negotiations can focus only on the supplier mark-up.

The system can mark procurements with a special flag where estimates cannot be created after scraping the net. Some acquisitions, including artistic items (for example, painting) can be flagged that estimates cannot be created. Those cases can be predefined and linked to the procurement request variable matrix.

Creating the Hypothetical Quantities

Hypothetical quantities (for example, estimated quantities) can be essential to conduct the commercial evaluation, especially for time unit rate and work unit rate contracts. In some cases, contracts can include a combination of lump sum, time unit rates, and work unit rates. While the quantity for lump sum is always one, the quantities for time unit rates and work unit rates need to be determined. There are different scenarios for determining the estimated quantities for work unit and time unit rates, and each scenario can be processed differently.

For replacement agreements, the quantities of time unit rate or work unit rate of the old agreement can be used unless the requestor instructed the system (during the initiation of the request) to make some changes. This can be indicated by stating something like "increase the quantities by 10%." In this case, the old quantities can be adjusted. Another approach is to take the actual utilization of the quantities of the replaced contract. Each contract can have a spreadsheet of all line items, estimated quantities, rates, and actual utilization, which can be used for analysis and for determining future hypothetical quantities. For contracts created for the first time, the system can ask the requestor to provide the estimated quantities while filling the initial procurement request. The commercial form can be created by the pro forma module, and the requester can be presented with the line items to specify the estimated quantities at once.

If the distribution of the quantities is unknown, the system can create hypothetical quantities by taking the procurement estimated value provided by the requestor in the procurement request variable matrix. The estimate development module can use the information to create balanced quantities distribution. Various distribution sets can be created and can be fed to a sensitivity analysis module to determine best sets of data to use. This is a useful approach for frame agreements where the utilization is unknown. For time unit contracts in which the payment is monthly payment or function of any time period, the total contract duration can be converted to quantities, such as in the case of lease agreements.

Commercial and Technical Evaluation

In traditional procurement processes, some organizations may elect to perform the technical evaluation prior to the commercial evaluation to avoid being influenced by suppliers who may propose lower prices based on quality of the service. However, this is not the case in the APS system, where there is no human intervention. Therefore, these two activities can be executed simultaneously without sacrificing quality. In fact, each supplier can be assigned a technical score in addition to a commercial score. The bid ranking can be a weighted average of the two scores.

The technical evaluation questionnaire can assess the supplier's ability to deliver the work and can be linked to the scope of work and other elements from the procurement request variable matrix. Standard sections of the questionnaire can cover supplier mobilization, allocated resources, manpower qualifications, and equipment specifications. These elements can be evaluated and authenticated in a similar way as the prequalification evaluation using similar underlying principles. Other sections of the questionnaire can be scope-dependent and can rely heavily on machine learning algorithms to determine the answers. The system can be loaded with previous technical questionnaire which can be fed into an AI Text Generator GPT-2 to process the training data and create relevant questionnaires. Scoring supplier responses can be executed using machine learning, where the greatest-adhering supplier responses can be given the highest scores and other responses can be ranked accordingly. However, some elements of the questionnaire can be evaluated as pass or fail in which suppliers can be excluded from the evaluation when not meeting a given mandatory requirement.

A technical evaluation of the technical proposal questionnaire can produce a technical score. Using a predefined minimum passing score (for example, 70%), suppliers who achieve the minimum passing score can remain under consideration while those failing can be excluded.

Commercial evaluation can be based on either a rate (in case of a lump sum) or on the result of the multiplication of the quantities by the rates. Quantities can be shared with the bidders (even if they are only estimated quantities with the bidders), or the quantities can be used by the system for sake of evaluation only. Estimated quantities can be created using a hypothetical quantities module. The total value for each commercial proposal can be created. Calculation algorithms can take into consideration any discounts offered by the supplier, distance factor, penalties, or other factors affecting the total cost of a bid. More complex commercial evaluation methodologies can be configured by the organization. However, the simple total value commercial evaluation is the primary approach that is used.

A spreadsheet can be created after the technical evaluation (if used) and commercial evaluations are completed. Bidders can be ranked in ascending order based either on their weighted combined technical or commercial scores. A column in the spreadsheet can be used to rank suppliers based on their technical scores. Another column in the spreadsheet can be based on their commercial scores only.

The purpose of conducting the technical and commercial evaluation is to determine the winning bidder. However, variations can exist among organizations (buyers) on how to determine the winning bidder (or awarded supplier). Some buyers can rely on the simplest method, which is the lowest commercial proposal from any technically qualified bidder regardless of the technical score. In this case, the lowest bidder in the evaluation spreadsheet can be the awarded supplier. This method of evaluation can typically be the most common technique for acquiring standard material items.

Another approach in determining the winning bidder is to have weighted evaluation formula that assigns weights for both commercial and technical evaluation scores. In this case, a weighted evaluation formula can be applied to determine the awarded supplier.

A third common approach is to negotiate with the N lowest bidders (for example, three bidders), where the determination of the N lowest bidders can be based on the simplest method or weighted evaluation technique. In this case, simultaneous negotiations can take place with the N lowest bidders. The negotiation module in this case can determine the lowest bidder. Other protocols can be used to determine the winning bidders using techniques such as reserve bidding. Alternative processes, or combinations of processes, can be accommodated as well.

Negotiations

Using the APS to handle negotiations can eliminate psychological influences that humans may encounter or inject in typical negotiation processes. A key element in successful negotiations is the holistic knowledge of the industry and the technical details of the given contract. Therefore, developing a system that uses artificially intelligent algorithms and has access to an all-inclusive database can be optimal. For example, the system can navigate through the buyer's requirements, taking into account the suppliers' level of flexibility to ensure that the results of the negotiation are optimal for all parties. Such algorithms can detect if a change in one term of the contract results in changes in the contract's monetary value. The system can look for a win-win outcome for all parties, taking into account the organization's preferences based on historical data. Reinforcement learning algorithms can enable the system to evaluate many different scenarios and all possible outcomes. The dialogue between the supplier and buyer can be automated using natural language processing, where the system can play the role of the buyer.

The system can conduct the negotiations using a more structured approach rather than intuitive approach. The negotiations can be conducted in all procurements unless the buyer's contracting polices require that negotiations occur for all procurement. The cases where the negotiations are mandatory can be predefined.

The negotiations can be limited to the commercial aspects of the proposal. In this case, an estimate that is developed by the system can be used as a basis for the negotiation. The system can use the estimate as a benchmark. A spreadsheet can be created that includes the commercial proposal and the estimate. A comparison between the commercial proposal and the estimate for each line item (for example, rates) can calculate the differences. If the estimate is higher than the commercial proposal, then the system can still send the supplier a request using the supplier account to lower their commercial proposal by a certain reasonable percentage (for example, 10%). If the commercial proposal is higher than the estimate, then the system can send the estimate as a counter-offer. If the bidder rejects the counter-offer, then the system can send a higher offer with a percentage increase that is lower than a predetermined cap (for example, 10% higher than the estimate). With each offer, the system can send a message. A repository of messages can be predefined, where the system can select a relevant message with a justification for the offer. The bidder can also enter a justification for the offer which can be processed using NPL. For example, suitable algorithm such as BERT can be used, and a response can be created from the repository, where unsupervised machine learning can be used to develop the response.

Allowing the bidder to negotiate the terms and conditions along with the price can be more challenging. In this case, changes to the terms and conditions can be translated into monetary values. Using artificial intelligence and deep learning algorithms can allow the system to predict the economic values of legal terms based on previous data. The system can update its learning data as new contracts are awarded. The monetary value can be treated as a base for the negotiations, and the system can run iterations of negotiations similar to the commercial negotiation process.

Agreement Award

The results of the commercial and technical evaluation module can be a key input in determining the winning bid. The award criteria can be based either on commercial evaluation (for those who are technically qualified) or a weighted evaluation. Both technical and commercial aspects can be considered when determining the best bid. Organizations can choose from a wide range of preconfigured award scenarios and algorithms to enable the platform to determine the winning bidder autonomously.

A final agreement package can be sent the supplier through a secured supplier account. Digital signature technologies can be used to legally sign the final agreement. After a final agreement is in place, other essential processes related to the contract administration can be developed and integrated with the system.

Supplier Payment

The line items (or rates) of a commercial form of each contract can be exported to the accounting system once the contract becomes active. Suppliers can submit their invoices through their supplier accounts. Invoices can be restricted by limiting invoice creation only to specific line items of the commercial form. This means that the APS can be used by the supplier to produce an invoice. In the case of cost plus agreements and where the line items are not defined, the supplier can have the flexibility to enter the line items. Once an invoice is submitted, a workflow can be sent directly to a contract administrator to certify that the invoice and a subsequent payment can be triggered to transfer a payment amount to the supplier's bank account. To handle payments for materials, the certification processes requiring human intervention can be skipped and can be replaced by radio-frequency identification (RFID) barcode reader receipts.

Figure 19:
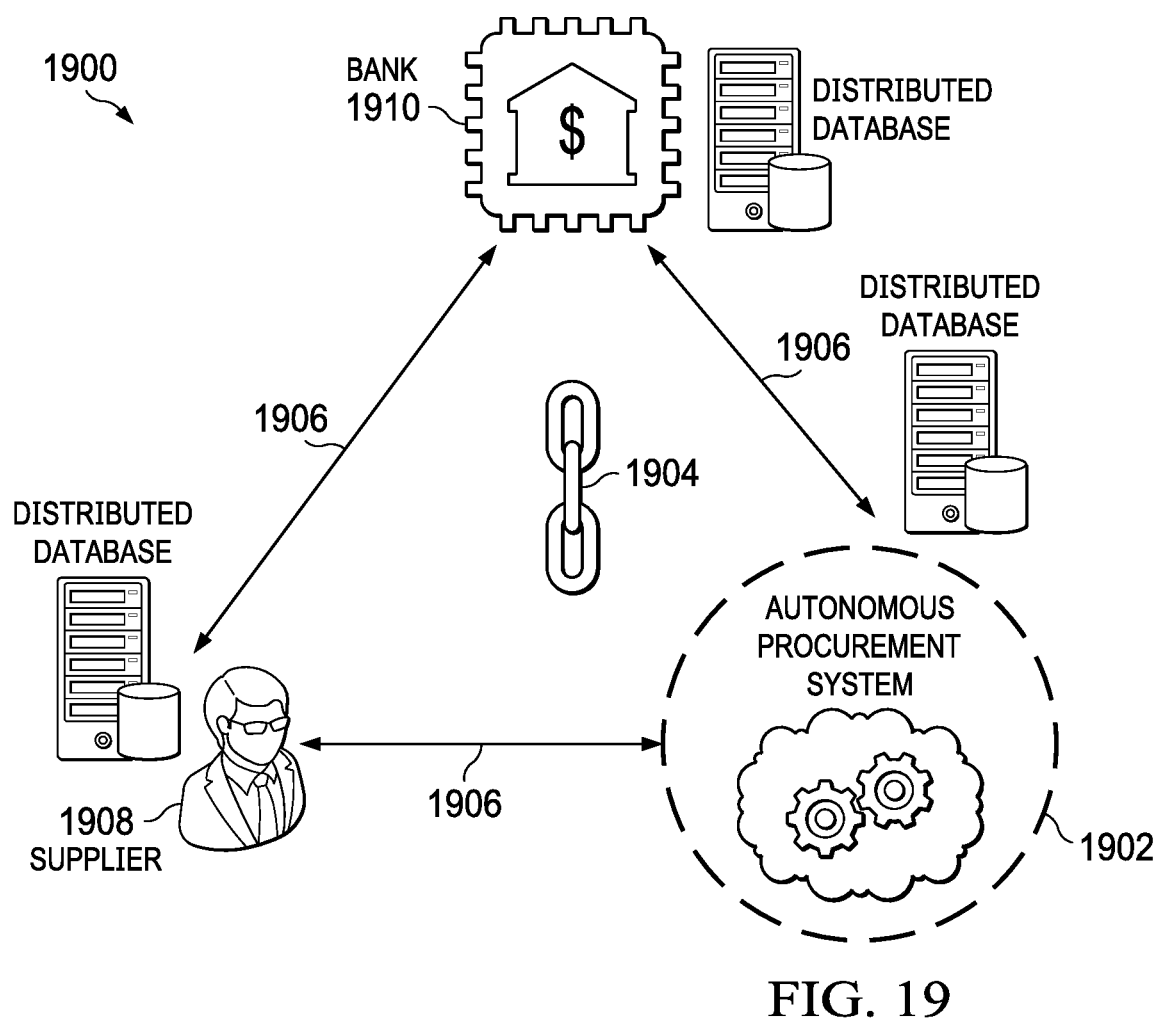
FIG. 19 is a block diagram showing an example of a workflow for supplier payment using blockchain technologies, according to some implementations of the present disclosure.

FIG. 19 is a block diagram showing an example of a workflow 1900 for supplier payment using blockchain technologies, according to some implementations of the present disclosure. For example, an APS 1902 can use modules that are built using blockchain and smart contract technologies 1904 to complete payment processes 1906 for suppliers 1908. Once the service is certified or goods are received, the system can automatically initiate the payment process. In particular, smart contract technology can be utilized to make payments to suppliers in a decentralized network and to handle the transactions with banks 1910. Transactions on the blockchain network can be tracked and monitored using blockchain technologies, raising the efficiency and accuracy level of the whole system.

If the APS 1902 is implemented without blockchain technology to handle supplier payments, additional verification steps can be added between the supplier and other parties. Such autonomous solution can include verifying that services have been provided, for example, before payments are made.

Spend Analysis

In order to support spend analysis and other metrics, all line items can have an associated service master which basically serves as a code. The system can retrieve the line items from all commercial forms and arrange them in a manner (or analyze the line items) to highlight the rates of the same line item under various agreements. The system can also retrieve the utilization of each line item across various agreements from supplier payments. In implementations not including service masters, spend analysis and other metrics also be achieved using machine learning. In this case, various line items with common descriptions can be collected, clustered, and analyzed to use the data points in completing spend analysis. Once the data points are available, various statistical analysis can be conducted, such as price disparities and correlations based on one or more of sources, location, and timing. Price trends and forecasts can be predicted. These examples and spend analysis in general can be useful in states having multiple agencies with similar agreements, where such analysis can provide optimal spend strategies.

In organizations having a known output layout, training data can be used to construct models used to classify inputs. The models can be used to suggest new categories based on pattern recognition. Unsupervised learning can be used if outputs is not known. Clustering analysis algorithms can group the data to find similarities within the database.

Supplier Performance

Once a contract is effective, a supplier performance form can be sent automatically (and periodically) to the contract administrator. The evaluation can be maintained under the contract and in the supplier record. The user can provide information on the performance of a supplier based on predefined criteria. The system can then process these comments using natural language processing and translate them into a score. Using artificial intelligence techniques, the system can later use this information to classify the supplier and determine the overall performance status. Supplier performance information can be fed into the bidder selection process.

Agreement Modifications

Sources for agreement modifications can include, for example, user demand or supplier request. For agreement modifications based on user demand, when the user requests a change in the agreement, a corresponding subset of the system can be triggered for the applicable modules. This modification can result in amending the agreement document.

For agreement modifications based on supplier request, a supplier can request a change in the agreement based on new developments. In such cases, natural language processing systems can scan legal contracts for relevant terms such as termination clauses, re-negotiation rights, and scope details. Extracting such critical data can give the system the ability to identify risks and opportunities and decide whether or not to accept the supplier's request. If the change is favorable, the system can review the procurement process again to accommodate the change. A smaller set of the core modules can be executed to process the modification. The modules associated with pro forma development, estimate development, invitation for proposals, commercial and technical evaluation, and negotiation can be executed by the system to determine the changes to the original agreement. This modification can result in revising the agreement document that was awarded to this supplier.

Figure 20:
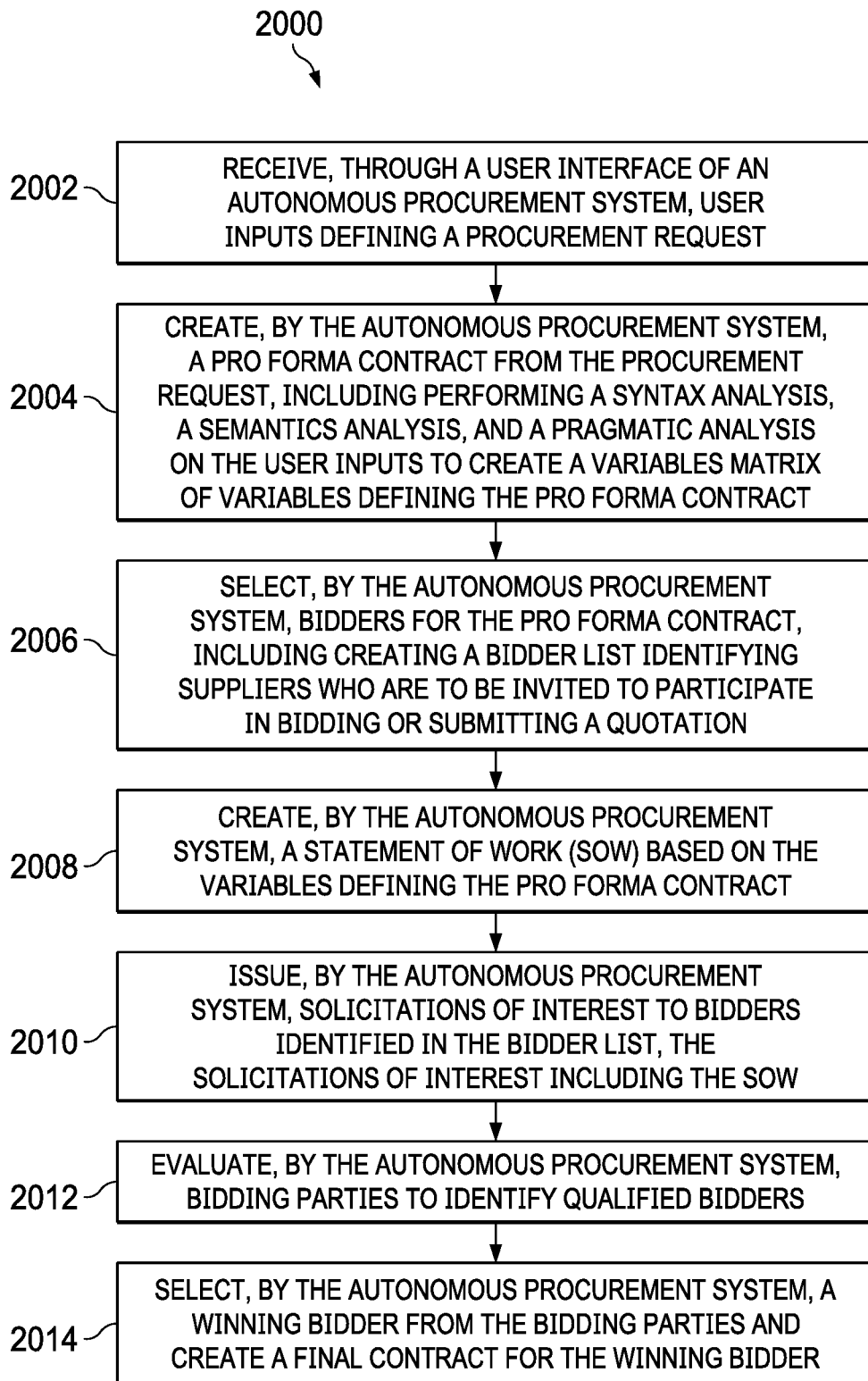
FIG. 20 is a flowchart of an example of a method for autonomous procurement, according to some implementations of the present disclosure.

FIG. 20 is a flowchart of an example of a method 2000 for autonomous procurement, according to some implementations of the present disclosure. For clarity of presentation, the description that follows generally describes method 2000 in the context of the other figures in this description. However, it will be understood that method 2000 can be performed, for example, by any suitable system, environment, software, and hardware, or a combination of systems, environments, software, and hardware, as appropriate. In some implementations, various steps of method 2000 can be run in parallel, in combination, in loops, or in any order.

At 2002, user inputs defining a procurement request are received through a user interface of an autonomous procurement system. As an example, referring to FIG. 1, the user 104 can create a procurement request in the APS 102 either verbally (for example, by phone 106 or audio 108) or in writing (for example, through the keyboard 110). The inputs can be received by the APS 102. In another example, the description of FIG. 4 describes how user input of the user 104 can be analyzed to create the variables matrix 410. From 2002, method 2000 proceeds to 2004.

At 2004, a pro forma contract is created from the procurement request by the autonomous procurement system. For example, an output of the system 102 can be the contract 120 that includes the requirements determined by the system 102. Creating the pro forma contract includes performing a syntax analysis, a semantics analysis, and a pragmatic analysis on the user inputs to create a variables matrix of variables defining the pro forma contract. The variables can include mandatory variables and one or more user-optional variables. The mandatory variables include a contract type, a contract scope category, a location of work, a contract duration, a contract commencement date, a procurement type, and a payment method. The one or more user-optional variables include scope details, a bidders list, evaluation criteria, a solicitation of interest, a prequalification requirement, financial qualification switch, a bidding strategy, and hypothetical quantities. From 2004, method 2000 proceeds to 2006.

At 2006, bidders for the pro forma contract are selected by the autonomous procurement system, including creating a bidder list identifying suppliers who are to be invited to participate in bidding or submitting a quotation. For example, selection of bidders can include some of the processing described with reference to FIG. 13. Different bidding strategies used by a bidder selection module 1300 can include open bidding 1302, selective bidding 1304, and ad hoc bidding 1306.

In some implementations, identifying and selecting potential bidders can include scraping the web to identify the potential bidders based on the variables defining the pro forma contract. For example, before finalizing the bidders list, the risk analysis 1308 can be conducted that includes performing a comprehensive search using Internet scraping for negative phrases associated with a bidder. Negative phrases can be associated with risks such as bankruptcy, court orders, lost cases, and debts. The risk analysis 1308 can determine each supplier's overall risk status. Natural language processing and web scraping technologies can be used for the risk analysis 1308.

In some implementations, the APS 102 can register suppliers, including obtaining, through an online registration process, supplier registration information including commercial license information and bank account information for each supplier being registered. The APS 102 can authenticate supplier registration information of the suppliers. From 2006, method 2000 proceeds to 2008.

At 2008, a statement of work (SOW) is created by the autonomous procurement system based on the variables defining the pro forma contract. For example, creating the SOW can be based on information scraped from the Internet. For example, the web can be scraped to identify similar scopes of work to use as training data into an AI text generator. Using the AI text generator, the SOW can be created based on the variables defining the pro forma contract. From 2008, method 2000 proceeds to 2010.

At 2010, solicitations of interest including the SOW are issued by the autonomous procurement system to bidders identified in the bidder list. As an example, referring to FIG. 15, the APS 1502 can send SOIs to each of the suppliers 1506. From 2010, method 2000 proceeds to 2012.

At 2012, bidding parties are evaluated by the autonomous procurement system to identify qualified bidders. Evaluating each bidding party can be based on various qualifications. For example, technical prequalification of potential bidding parties can be conducted to assess technical capabilities of each potential bidding party to ensure the potential bidding party is qualified to deliver requirements of a scope of work defined by the variables matrix. A financial qualification evaluation can be conducted that includes evaluating a cash flow of a bidding party and reviewing financial statements of the bidding party. From 2012, method 2000 proceeds to 2014.

At 2014, a winning bidder is selected by the autonomous procurement system from the bidding parties, and a final contract for the winning bidder is created. For example, referring to FIG. 2, after the winning bidder 226 is determined, agreement award 224 can occur. Determining the winning bidder can be based on the commercial/technical evaluation or the outcome of negotiations, for example. In some implementations, selecting the winning bidder from the bidding parties and creating a final contract for the winning bidder can include conducting negotiations with bidding parties to negotiate prices and terms of the final contract, and determining estimates and budgets for the final contract. After 2014, method 2000 can stop.

In some implementations, method 2000 can further include processing payments associated with final contract. For example, referring to FIG. 19, the APS 1902 can use modules that are built using blockchain and smart contract technologies 1904 to complete the payment processes 1906 for the suppliers 1908.

Figure 21:
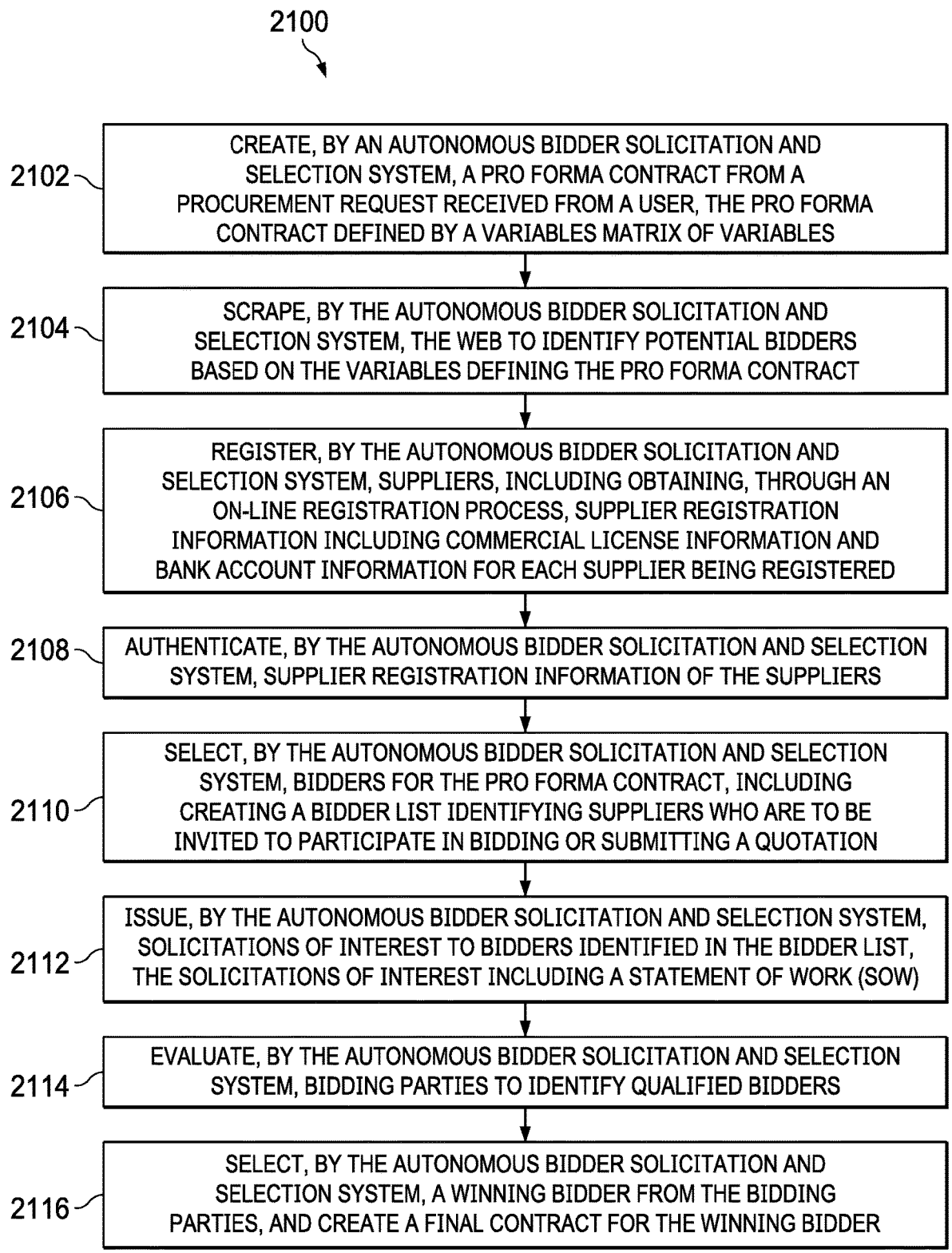
FIG. 21 is a flowchart of an example of a method for autonomous bidder solicitation and selection, according to some implementations of the present disclosure.

FIG. 21 is a flowchart of an example of a method 2100 for autonomous bidder solicitation and selection, according to some implementations of the present disclosure. For clarity of presentation, the description that follows generally describes method 2100 in the context of the other figures in this description. However, it will be understood that method 2100 can be performed, for example, by any suitable system, environment, software, and hardware, or a combination of systems, environments, software, and hardware, as appropriate. In some implementations, various steps of method 2100 can be run in parallel, in combination, in loops, or in any order.

At 2102, a pro forma contract is created by an autonomous bidder solicitation and selection system. For example, an output of the system 102 can be the contract 120 that includes the requirements determined by the system 102. The pro forma contract is defined by a variables matrix of variables and is created from a procurement request received from a user. The variables can include mandatory variables and one or more user-optional variables. Creating the pro forma contract can include performing a syntax analysis, a semantics analysis, and a pragmatic analysis on the user inputs to create a variables matrix of variables defining the pro forma contract. The variables can include mandatory variables and one or more user-optional variables. The mandatory variables include a contract type, a contract scope category, a location of work, a contract duration, a contract commencement date, a procurement type, and a payment method. The one or more user-optional variables can include scope details, a bidders list, evaluation criteria, a solicitation of interest, a prequalification requirement, financial qualification switch, a bidding strategy, and hypothetical quantities.

In some implementations, the mandatory variables can include a contract type, a contract scope category, a location of work, a contract duration, a contract commencement date, a procurement type, and a payment method. The one or more user-optional variables include scope details, a bidders list, evaluation criteria, a solicitation of interest, a prequalification requirement, financial qualification switch, a bidding strategy, and hypothetical quantities. Creating the pro forma contract can include performing a syntax analysis, a semantics analysis, and a pragmatic analysis on user inputs included in the procurement request to create the variables matrix of variables defining the pro forma contract. From 2102, method 2100 proceeds to 2104.

At 2104, the web is scraped by the autonomous bidder solicitation and selection system to identify potential bidders based on the variables defining the pro forma contract. For example, before finalizing the bidders list, the risk analysis 1308 can be conducted that includes performing a comprehensive search using Internet scraping for negative phrases associated with a bidder. Negative phrases can be associated with risks such as bankruptcy, court orders, lost cases, and debts. The risk analysis 1308 can determine each supplier's overall risk status. Natural language processing and web scraping technologies can be used for the risk analysis 1308. From 2104, method 2100 proceeds to 2106.

At 2106, suppliers are registered by the autonomous bidder solicitation and selection system, including obtaining, through an on-line registration process, supplier registration information including commercial license information and bank account information for each supplier being registered. For example, the APS 102 can register suppliers, including obtaining, through an on-line registration process, supplier registration information including commercial license information and bank account information for each supplier being registered. The APS 102 can authenticate supplier registration information of the suppliers. From 2106, method 2100 proceeds to 2108.

At 2108, supplier registration information of the suppliers is authenticated by the autonomous bidder solicitation and selection system. For example, the APS 102 can register suppliers, including obtaining, through an on-line registration process, supplier registration information including commercial license information and bank account information for each supplier being registered. The APS 102 can authenticate supplier registration information of the suppliers. From 2108, method 2100 proceeds to 2110.

At 2110, bidders for the pro forma contract are selected by the autonomous bidder solicitation and selection system, including creating a bidder list identifying suppliers who are to be invited to participate in bidding or submitting a quotation. For example, selection of bidders can include some of the processing described with reference to FIG. 13. Different bidding strategies used by a bidder selection module 1300 can include open bidding 1302, selective bidding 1304, and ad hoc bidding 1306. From 2110, method 2100 proceeds to 2112.

At 2112, solicitations of interest are issued, by the autonomous bidder solicitation and selection system, to bidders identified in the bidder list, the solicitations of interest including a SOW. Creating the SOW can include, for example, scraping the web to identify similar scopes of work to use as training data into an AI text generator and creating, using the AI text generator, the SOW based on the variables defining the pro forma contract. From 2112, method 2100 proceeds to 2114.

At 2114, bidding parties are evaluated by the autonomous bidder solicitation and selection system to identify qualified bidders. In some implementations, evaluating each bidding party can include conducting evaluations. For example, a technical prequalification of potential bidding parties can be conducted to assess technical capabilities of each potential bidding party to ensure a given potential bidding party is qualified to deliver requirements of a scope of work defined by the variables matrix. A financial qualification evaluation can be conducted including evaluating a cash flow of the given potential bidding party and reviewing financial statements of the given potential bidding party. From 2114, method 2100 proceeds to 2116.

At 2116, a winning bidder is selected from the bidding parties by the autonomous bidder solicitation and selection system, and a final contract is created for the winning bidder. Selecting the winning bidder from the bidding parties and creating a final contract for the winning bidder can include conducting negotiations with bidding parties to negotiate prices and terms of the final contract and determining estimates and budgets for the final contract. After 2116, method 2100 can stop.

In some implementations, method 2100 can further include steps for supplier registration. A supplier-tailored questionnaire can be created for each supplier using the supplier registration information and the variables matrix of variables. The supplier-tailored questionnaire can serve as a technical prequalification proposal and can address the previous experience and resources of the supplier. The supplier-tailored questionnaire can be sent to each of the suppliers. A completed questionnaires can be received from each of the suppliers. Information in the completed questionnaires can be used in evaluating bidding parties to identify qualified bidders.

In some implementations, method 2100 can further include processing payments associated with final contract.

For example, referring to FIG. 19, the APS 1902 can use modules that are built using blockchain and smart contract technologies 1904 to complete the payment processes 1906 for the suppliers 1908.

Figure 22:
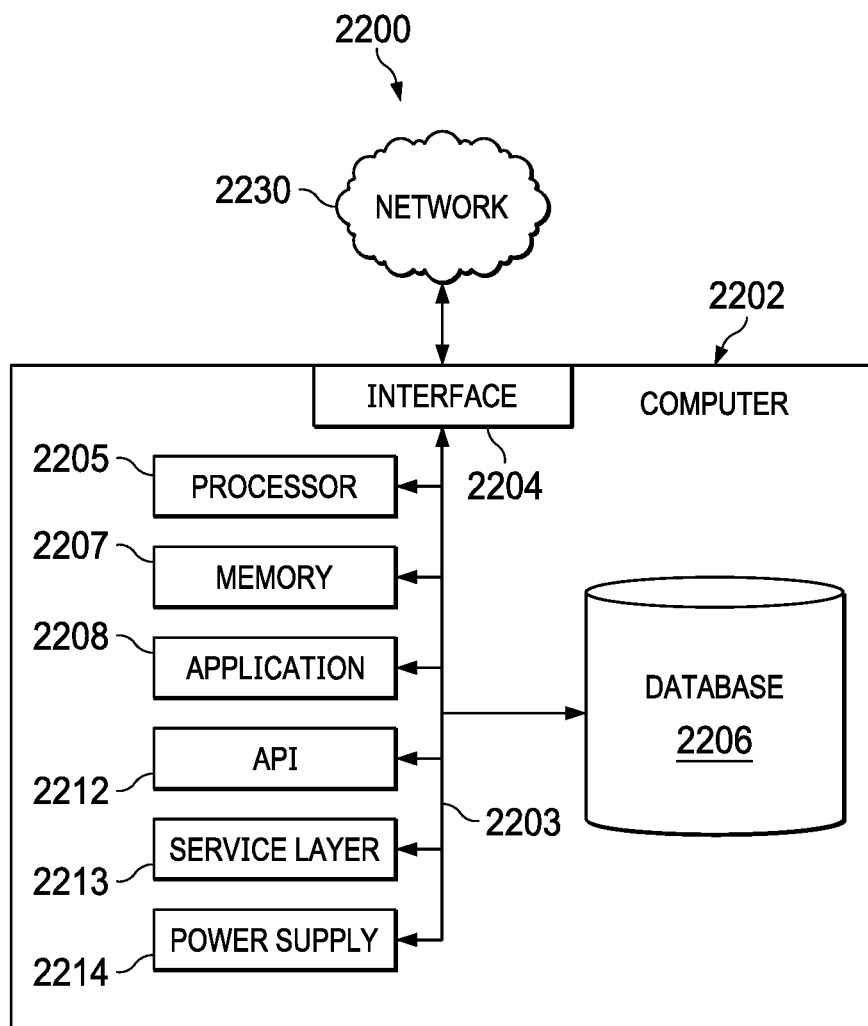
FIG. 22 is a block diagram illustrating an example computer system used to provide computational functionalities associated with described algorithms, methods, functions, processes, flows, and procedures as described in the present disclosure, according to some implementations of the present disclosure.

FIG. 22 is a block diagram of an example computer system 2200 used to provide computational functionalities associated with described algorithms, methods, functions, processes, flows, and procedures described in the present disclosure, according to some implementations of the present disclosure. The illustrated computer 2202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2202 can include input devices such as keypads, keyboards, and touch screens that can accept user information. Also, the computer 2202 can include output devices that can convey information associated with the operation of the computer 2202. The information can include digital data, visual data, audio information, or a combination of information. The information can be presented in a graphical user interface (UI) (or GUI).

The computer 2202 can serve in a role as a client, a network component, a server, a database, a persistency, or components of a computer system for performing the subject matter described in the present disclosure. The illustrated computer 2202 is communicably coupled with a network 2230. In some implementations, one or more components of the computer 2202 can be configured to operate within different environments, including cloud-computing-based environments, local environments, global environments, and combinations of environments.

At a top level, the computer 2202 is an electronic computing device operable to receive, transmit, process, store, and manage data and information associated with the described subject matter. According to some implementations, the computer 2202 can also include, or be communicably coupled with, an application server, an email server, a web server, a caching server, a streaming data server, or a combination of servers.

The computer 2202 can receive requests over network 2230 from a client application (for example, executing on another computer 2202). The computer 2202 can respond to the received requests by processing the received requests using software applications. Requests can also be sent to the computer 2202 from internal users (for example, from a command console), external (or third) parties, automated applications, entities, individuals, systems, and computers.

Each of the components of the computer 2202 can communicate using a system bus 2203. In some implementations, any or all of the components of the computer 2202, including hardware or software components, can interface with each other or the interface 2204 (or a combination of both) over the system bus 2203. Interfaces can use an application programming interface (API) 2212, a service layer 2213, or a combination of the API 2212 and service layer 2213. The API 2212 can include specifications for routines, data structures, and object classes. The API 2212 can be either computer-language independent or dependent. The API 2212 can refer to a complete interface, a single function, or a set of APIs.

The service layer 2213 can provide software services to the computer 2202 and other components (whether illustrated or not) that are communicably coupled to the computer 2202. The functionality of the computer 2202 can be accessible for all service consumers using this service layer. Software services, such as those provided by the service layer 2213, can provide reusable, defined functionalities through a defined interface. For example, the interface can be software written in JAVA, C++, or a language providing data in extensible markup language (XML) format. While illustrated as an integrated component of the computer 2202, in alternative implementations, the API 2212 or the service layer 2213 can be stand-alone components in relation to other components of the computer 2202 and other components communicably coupled to the computer 2202. Moreover, any or all parts of the API 2212 or the service layer 2213 can be implemented as child or sub-modules of another software module, enterprise application, or hardware module without departing from the scope of the present disclosure.

The computer 2202 includes an interface 2204. Although illustrated as a single interface 2204 in FIG. 22, two or more interfaces 2204 can be used according to particular needs, desires, or particular implementations of the computer 2202 and the described functionality. The interface 2204 can be used by the computer 2202 for communicating with other systems that are connected to the network 2230 (whether illustrated or not) in a distributed environment. Generally, the interface 2204 can include, or be implemented using, logic encoded in software or hardware (or a combination of software and hardware) operable to communicate with the network 2230. More specifically, the interface 2204 can include software supporting one or more communication protocols associated with communications. As such, the network 2230 or the interface's hardware can be operable to communicate physical signals within and outside of the illustrated computer 2202.

The computer 2202 includes a processor 2205. Although illustrated as a single processor 2205 in FIG. 22, two or more processors 2205 can be used according to particular needs, desires, or particular implementations of the computer 2202 and the described functionality. Generally, the processor 2205 can execute instructions and can manipulate data to perform the operations of the computer 2202, including operations using algorithms, methods, functions, processes, flows, and procedures as described in the present disclosure.

The computer 2202 also includes a database 2206 that can hold data for the computer 2202 and other components connected to the network 2230 (whether illustrated or not). For example, database 2206 can be an in-memory, conventional, or a database storing data consistent with the present disclosure. In some implementations, database 2206 can be a combination of two or more different database types (for example, hybrid in-memory and conventional databases) according to particular needs, desires, or particular implementations of the computer 2202 and the described functionality. Although illustrated as a single database 2206 in FIG. 22, two or more databases (of the same, different, or combination of types) can be used according to particular needs, desires, or particular implementations of the computer 2202 and the described functionality. While database 2206 is illustrated as an internal component of the computer 2202, in alternative implementations, database 2206 can be external to the computer 2202.

The computer 2202 also includes a memory 2207 that can hold data for the computer 2202 or a combination of components connected to the network 2230 (whether illustrated or not). Memory 2207 can store any data consistent with the present disclosure. In some implementations, memory 2207 can be a combination of two or more different types of memory (for example, a combination of semiconductor and magnetic storage) according to particular needs, desires, or particular implementations of the computer 2202 and the described functionality. Although illustrated as a single memory 2207 in FIG. 22, two or more memories 2207 (of the same, different, or combination of types) can be used according to particular needs, desires, or particular implementations of the computer 2202 and the described functionality. While memory 2207 is illustrated as an internal component of the computer 2202, in alternative implementations, memory 2207 can be external to the computer 2202.

The application 2208 can be an algorithmic software engine providing functionality according to particular needs, desires, or particular implementations of the computer 2202 and the described functionality. For example, application 2208 can serve as one or more components, modules, or applications. Further, although illustrated as a single application 2208, the application 2208 can be implemented as multiple applications 2208 on the computer 2202. In addition, although illustrated as internal to the computer 2202, in alternative implementations, the application 2208 can be external to the computer 2202.

The computer 2202 can also include a power supply 2214. The power supply 2214 can include a rechargeable or non-rechargeable battery that can be configured to be either user- or non-user-replaceable. In some implementations, the power supply 2214 can include power-conversion and management circuits, including recharging, standby, and power management functionalities. In some implementations, the power-supply 2214 can include a power plug to allow the computer 2202 to be plugged into a wall socket or a power source to, for example, power the computer 2202 or recharge a rechargeable battery.

There can be any number of computers 2202 associated with, or external to, a computer system containing computer 2202, with each computer 2202 communicating over network 2230. Further, the terms "client," "user," and other appropriate terminology can be used interchangeably, as appropriate, without departing from the scope of the present disclosure. Moreover, the present disclosure contemplates that many users can use one computer 2202 and one user can use multiple computers 2202.

Described implementations of the subject matter can include one or more features, alone or in combination.

For example, in a first implementation, a computer-implemented method includes the following. A pro forma contract is created by an autonomous bidder solicitation and selection system. The pro forma contract is defined by a variables matrix of variables and is created from a procurement request received from a user. The web is scraped by the autonomous bidder solicitation and selection system to identify potential bidders based on the variables defining the pro forma contract. Suppliers are registered by the autonomous bidder solicitation and selection system, including obtaining, through an on-line registration process, supplier registration information including commercial license information and bank account information for each supplier being registered. Supplier registration information of the suppliers is authenticated by the autonomous bidder solicitation and selection system. Bidders for the pro forma contract are selected by the autonomous bidder solicitation and selection system, including creating a bidder list identifying suppliers who are to be invited to participate in bidding or submitting a quotation. Solicitations of interest are issued, by the autonomous bidder solicitation and selection system, to bidders identified in the bidder list, the solicitations of interest including a statement of work (SOW). Bidding parties are evaluated by the autonomous bidder solicitation and selection system to identify qualified bidders. A winning bidder is selected from the bidding parties by the autonomous bidder solicitation and selection system. A final contract is created for the winning bidder.

The foregoing and other described implementations can each, optionally, include one or more of the following features:

A first feature, combinable with any of the following features, where the variables include mandatory variables and one or more user-optional variables.

A second feature, combinable with any of the previous or following features, where the mandatory variables include a contract type, a contract scope category, a location of work, a contract duration, a contract commencement date, a procurement type, and a payment method.

A third feature, combinable with any of the previous or following features, where the one or more user-optional variables include scope details, a bidders list, evaluation criteria, a solicitation of interest, a prequalification requirement, financial qualification switch, a bidding strategy, and hypothetical quantities.

A fourth feature, combinable with any of the previous or following features, where creating the pro forma contract includes performing a syntax analysis, a semantics analysis, and a pragmatic analysis on user inputs included in the procurement request to create the variables matrix of variables defining the pro forma contract.

A fifth feature, combinable with any of the previous or following features, the method further including: creating, using the supplier registration information and the variables matrix of variables, a supplier-tailored questionnaire for each supplier, the supplier-tailored questionnaire serving as a technical prequalification proposal and addressing previous experience and resources of the supplier; sending the supplier-tailored questionnaire to each of the suppliers; receiving a completed questionnaire from each of the suppliers; and using information in the completed questionnaires in evaluating bidding parties to identify qualified bidders.

A sixth feature, combinable with any of the previous or following features, where evaluating each bidding party includes: conducting, by the autonomous bidder solicitation and selection system, a technical prequalification of potential bidding parties to assess technical capabilities of each potential bidding party to ensure a given potential bidding party is qualified to deliver requirements of a scope of work defined by the variables matrix; and conducting, by the autonomous bidder solicitation and selection system, a financial qualification evaluation including evaluating a cash flow of the given potential bidding party and reviewing financial statements of the given potential bidding party.

A seventh feature, combinable with any of the previous or following features, the operations further including creating the SOW based on the variables defining the pro forma contract, where creating the SOW includes: scraping, by the autonomous bidder solicitation and selection system, the web to identify similar scopes of work to use as training data into an artificial intelligence (AI) text generator; and creating, by the autonomous bidder solicitation and selection system using the AI text generator, the SOW based on the variables defining the pro forma contract.

An eighth feature, combinable with any of the previous or following features, where selecting the winning bidder from the bidding parties and creating a final contract for the winning bidder includes: conducting, by the autonomous bidder solicitation and selection system, negotiations with bidding parties to negotiate prices and terms of the final contract; and determining, by the autonomous bidder solicitation and selection system, estimates and budgets for the final contract.

A ninth feature, combinable with any of the previous or following features, the operations further including processing, by the autonomous bidder solicitation and selection system, payments associated with final contract.

In a second implementation, a non-transitory, computer-readable medium stores one or more instructions executable by a computer system to perform operations including the following. A pro forma contract is created by an autonomous bidder solicitation and selection system. The pro forma contract is defined by a variables matrix of variables and is created from a procurement request received from a user. The web is scraped by the autonomous bidder solicitation and selection system to identify potential bidders based on the variables defining the pro forma contract. Suppliers are registered by the autonomous bidder solicitation and selection system, including obtaining, through an on-line registration process, supplier registration information including commercial license information and bank account information for each supplier being registered. Supplier registration information of the suppliers is authenticated by the autonomous bidder solicitation and selection system. Bidders for the pro forma contract are selected by the autonomous bidder solicitation and selection system, including creating a bidder list identifying suppliers who are to be invited to participate in bidding or submitting a quotation. Solicitations of interest are issued, by the autonomous bidder solicitation and selection system, to bidders identified in the bidder list, the solicitations of interest including a statement of work (SOW). Bidding parties are evaluated by the autonomous bidder solicitation and selection system to identify qualified bidders. A winning bidder is selected from the bidding parties by the autonomous bidder solicitation and selection system. A final contract is created for the winning bidder.

The foregoing and other described implementations can each, optionally, include one or more of the following features:

A first feature, combinable with any of the following features, where the variables include mandatory variables and one or more user-optional variables.

A second feature, combinable with any of the previous or following features, where the mandatory variables include a contract type, a contract scope category, a location of work, a contract duration, a contract commencement date, a procurement type, and a payment method.

A third feature, combinable with any of the previous or following features, where the one or more user-optional variables include scope details, a bidders list, evaluation criteria, a solicitation of interest, a prequalification requirement, financial qualification switch, a bidding strategy, and hypothetical quantities.

A fourth feature, combinable with any of the previous or following features, where creating the pro forma contract includes performing a syntax analysis, a semantics analysis, and a pragmatic analysis on user inputs included in the procurement request to create the variables matrix of variables defining the pro forma contract.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A pro forma contract is created by an autonomous bidder solicitation and selection system. The pro forma contract is defined by a variables matrix of variables and is created from a procurement request received from a user. The web is scraped by the autonomous bidder solicitation and selection system to identify potential bidders based on the variables defining the pro forma contract. Suppliers are registered by the autonomous bidder solicitation and selection system, including obtaining, through an on-line registration process, supplier registration information including commercial license information and bank account information for each supplier being registered. Supplier registration information of the suppliers is authenticated by the autonomous bidder solicitation and selection system. Bidders for the pro forma contract are selected by the autonomous bidder solicitation and selection system, including creating a bidder list identifying suppliers who are to be invited to participate in bidding or submitting a quotation. Solicitations of interest are issued, by the autonomous bidder solicitation and selection system, to bidders identified in the bidder list, the solicitations of interest including a statement of work (SOW). Bidding parties are evaluated by the autonomous bidder solicitation and selection system to identify qualified bidders. A winning bidder is selected from the bidding parties by the autonomous bidder solicitation and selection system. A final contract is created for the winning bidder.

The foregoing and other described implementations can each, optionally, include one or more of the following features:

A first feature, combinable with any of the following features, where the variables include mandatory variables and one or more user-optional variables.

A second feature, combinable with any of the previous or following features, where the mandatory variables include a contract type, a contract scope category, a location of work, a contract duration, a contract commencement date, a procurement type, and a payment method.

A third feature, combinable with any of the previous or following features, where the one or more user-optional variables include scope details, a bidders list, evaluation criteria, a solicitation of interest, a prequalification requirement, financial qualification switch, a bidding strategy, and hypothetical quantities.

A fourth feature, combinable with any of the previous or following features, where creating the pro forma contract includes performing a syntax analysis, a semantics analysis, and a pragmatic analysis on user inputs included in the procurement request to create the variables matrix of variables defining the pro forma contract.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    creating, by an autonomous bidder solicitation and selection system, a pro forma contract from a procurement request received from a user, the pro forma contract defined by a variables matrix of variables, wherein creating a statement of work (SOW) comprises:
        scraping, by the autonomous bidder solicitation and selection system, the web to identify similar scopes of work to use as training data into an artificial intelligence (AI) text generator; and
        creating, by the autonomous bidder solicitation and selection system using the AI text generator, the SOW based on the variables defining the pro forma contract;
    scraping, by the autonomous bidder solicitation and selection system, the web to identify potential bidders based on the variables defining the pro forma contract;
    registering, by the autonomous bidder solicitation and selection system, suppliers, including obtaining, through an on-line registration process, supplier registration information including commercial license information and bank account information for each supplier being registered;

authenticating, by the autonomous bidder solicitation and selection system, supplier registration information of the suppliers;

selecting, by the autonomous bidder solicitation and selection system, bidders for the pro forma contract, including creating a bidder list identifying suppliers who are to be invited to participate in bidding or submitting a quotation;

issuing, by the autonomous bidder solicitation and selection system, solicitations of interest to bidders identified in the bidder list, the solicitations of interest including the SOW;

evaluating, by the autonomous bidder solicitation and selection system, bidding parties to identify qualified bidders;

selecting, by the autonomous bidder solicitation and selection system, a winning bidder from the bidding parties and creating a final contract for the winning bidder.

2. The computer-implemented method of claim 1, wherein the variables include mandatory variables and one or more user-optional variables.

3. The computer-implemented method of claim 2, wherein the mandatory variables include a contract type, a contract scope category, a location of work, a contract duration, a contract commencement date, a procurement type, and a payment method.

4. The computer-implemented method of claim 2, wherein the one or more user-optional variables include scope details, a bidders list, evaluation criteria, a solicitation of interest, a prequalification requirement, financial qualification switch, a bidding strategy, and hypothetical quantities.

5. The computer-implemented method of claim 1, wherein creating the pro forma contract comprises performing a syntax analysis, a semantics analysis, and a pragmatic analysis on user inputs included in the procurement request to create the variables matrix of variables defining the pro forma contract.

6. The computer-implemented method of claim 1, further comprising:
creating, using the supplier registration information and the variables matrix of variables, a supplier-tailored questionnaire for each supplier, the supplier-tailored questionnaire serving as a technical prequalification proposal and addressing previous experience and resources of the supplier;
sending the supplier-tailored questionnaire to each of the suppliers;
receiving a completed questionnaire from each of the suppliers; and
using information in the completed questionnaires in evaluating bidding parties to identify qualified bidders.

7. The computer-implemented method of claim 1, wherein evaluating the potential bidding parties comprises:
conducting, by the autonomous bidder solicitation and selection system, a technical prequalification of potential bidding parties to assess technical capabilities of the potential bidding parties to ensure a given potential bidding party is qualified to deliver requirements of a scope of work defined by the variables matrix; and
conducting, by the autonomous bidder solicitation and selection system, a financial qualification evaluation including evaluating a cash flow of the given potential bidding party and reviewing financial statements of the given potential bidding party.

8. The computer-implemented method of claim 1, wherein selecting the winning bidder from the bidding parties and creating a final contract for the winning bidder includes:
conducting, by the autonomous bidder solicitation and selection system, negotiations with bidding parties to negotiate prices and terms of the final contract; and
determining, by the autonomous bidder solicitation and selection system, estimates and budgets for the final contract.

9. The computer-implemented method of claim 1, further comprising processing, by the autonomous bidder solicitation and selection system, payments associated with the final contract.

10. A non-transitory, computer-readable medium storing one or more instructions executable by a computer system to perform operations comprising:
creating, by an autonomous bidder solicitation and selection system, a pro forma contract from a procurement request received from a user, the pro forma contract defined by a variables matrix of variables, wherein creating a statement of work (SOW) comprises:
scraping, by the autonomous bidder solicitation and selection system, the web to identify similar scopes of work to use as training data into an artificial intelligence (AI) text generator; and
creating, by the autonomous bidder solicitation and selection system using the AI text generator, the SOW based on the variables defining the pro forma contract;
scraping, by the autonomous bidder solicitation and selection system, the web to identify potential bidders based on the variables defining the pro forma contract;
registering, by the autonomous bidder solicitation and selection system, suppliers, including obtaining, through an on-line registration process, supplier registration information including commercial license information and bank account information for each supplier being registered;
authenticating, by the autonomous bidder solicitation and selection system, supplier registration information of the suppliers;
selecting, by the autonomous bidder solicitation and selection system, bidders for the pro forma contract, including creating a bidder list identifying suppliers who are to be invited to participate in bidding or submitting a quotation;
issuing, by the autonomous bidder solicitation and selection system, solicitations of interest to bidders identified in the bidder list, the solicitations of interest including the SOW;
evaluating, by the autonomous bidder solicitation and selection system, bidding parties to identify qualified bidders; and
selecting, by the autonomous bidder solicitation and selection system, a winning bidder from the bidding parties and creating a final contract for the winning bidder.

11. The non-transitory, computer-readable medium of claim 10, wherein the variables include mandatory variables and one or more user-optional variables.

12. The non-transitory, computer-readable medium of claim 11, wherein the mandatory variables include a contract type, a contract scope category, a location of work, a contract duration, a contract commencement date, a procurement type, and a payment method.

13. The non-transitory, computer-readable medium of claim 11, wherein the one or more user-optional variables include scope details, a bidders list, evaluation criteria, a solicitation of interest, a prequalification requirement, financial qualification switch, a bidding strategy, and hypothetical quantities.

14. The non-transitory, computer-readable medium of claim 10, wherein creating the pro forma contract comprises performing a syntax analysis, a semantics analysis, and a pragmatic analysis on user inputs included in the procurement request to create the variables matrix of variables defining the pro forma contract.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
creating, by an autonomous bidder solicitation and selection system, a pro forma contract from a procurement request received from a user, the pro forma contract defined by a variables matrix of variables, wherein creating a statement of work (SOW) comprises:
scraping, by the autonomous bidder solicitation and selection system, the web to identify similar scopes of work to use as training data into an artificial intelligence (AI) text generator; and
creating, by the autonomous bidder solicitation and selection system using the AI text generator, the SOW based on the variables defining the pro forma contract;
scraping, by the autonomous bidder solicitation and selection system, the web to identify potential bidders based on the variables defining the pro forma contract;
registering, by the autonomous bidder solicitation and selection system, suppliers, including obtaining, through an on-line registration process, supplier registration information including commercial license information and bank account information for each supplier being registered;
authenticating, by the autonomous bidder solicitation and selection system, supplier registration information of the suppliers;
selecting, by the autonomous bidder solicitation and selection system, bidders for the pro forma contract, including creating a bidder list identifying suppliers who are to be invited to participate in bidding or submitting a quotation;
issuing, by the autonomous bidder solicitation and selection system, solicitations of interest to bidders identified in the bidder list, the solicitations of interest including the SOW;
evaluating, by the autonomous bidder solicitation and selection system, bidding parties to identify qualified bidders; and
selecting, by the autonomous bidder solicitation and selection system, a winning bidder from the bidding parties and creating a final contract for the winning bidder.

16. The computer-implemented system of claim 15, wherein the variables include mandatory variables and one or more user-optional variables.

17. The computer-implemented system of claim 16, wherein the mandatory variables include a contract type, a contract scope category, a location of work, a contract duration, a contract commencement date, a procurement type, and a payment method.

18. The computer-implemented system of claim 16, wherein the one or more user-optional variables include scope details, a bidders list, evaluation criteria, a solicitation of interest, a prequalification requirement, financial qualification switch, a bidding strategy, and hypothetical quantities.

19. The computer-implemented system of claim 15, wherein creating the pro forma contract comprises performing a syntax analysis, a semantics analysis, and a pragmatic analysis on user inputs included in the procurement request to create the variables matrix of variables defining the pro forma contract.

\* \* \* \* \*